US012564943B2

(12) United States Patent
Lu et al.

(10) Patent No.:  US 12,564,943 B2

(45) Date of Patent:         Mar. 3, 2026

(54) AERIAL CONTINUUM MANIPULATOR WITH KINEMATICS FOR VARIABLE LOADING AND MINIMAL TENDON-SLACKING

(71) Applicant: The University of Hong Kong, Hong Kong (CN)

(72) Inventors: Peng Lu, Hong Kong (CN); Rui Peng, Hong Kong (CN); Zehao Wang, Shenzhen (CN)

(73) Assignee: The University of Hong Kong, Hong Kong (CN)

( * ) Notice: Subject to any disclaimer, the term of this patent is extended or adjusted under 35 U.S.C. 154(b) by 166 days.

(21) Appl. No.: 18/191,494

(22) Filed: Mar. 28, 2023

(65) Prior Publication Data

US 2023/0339106 A1     Oct. 26, 2023

Related U.S. Application Data

(60) Provisional application No. 63/363,228, filed on Apr. 19, 2022.

(51) Int. Cl.
   *B25J 9/16*          (2006.01)
   *B25J 9/10*          (2006.01)
   (Continued)

(52) U.S. Cl.
   CPC ............. *B25J 9/162* (2013.01); *B25J 9/1075* (2013.01); *B25J 13/088* (2013.01); *B64U 30/20* (2023.01); *B64U 2201/10* (2023.01)

(58) Field of Classification Search
   CPC ........ B25J 9/162; B25J 9/1075; B25J 13/088; B25J 9/1045; B25J 9/1625; B25J 18/06;
   (Continued)

(56) References Cited

U.S. PATENT DOCUMENTS

2013/0131868 A1*  5/2013  Rucker .................. B25J 9/1625
                                                    700/262
2017/0300066 A1*  10/2017  Douglas ............... G05D 1/0858
   (Continued)

FOREIGN PATENT DOCUMENTS

WO     WO-2019129085 A1 *  7/2019  ........... B64C 39/024

OTHER PUBLICATIONS

Modeling and Control of Aerial Continuum Manipulation Systems: A Flying Continuum Robot Paradigm (Year: 2020).*

*Primary Examiner* — Adam R Mott
*Assistant Examiner* — Sagar Kc
(74) *Attorney, Agent, or Firm* — SALIWANCHIK, LLOYD & EISENSCHENK

(57)                ABSTRACT

The subject invention pertains to a novel aerial manipulation system with a flying continuum robotic manipulator (Ae-CoM). A lightweight tendon-driven continuum robotic arm is coupled with an unmanned aerial vehicle. An attitude sensor (IMU) is used to assist in PCC (Piecewise Constant Curvature) configuration. A tension-based closed-loop control method is used to avoid tendon slacking in manipulating the shape of the continuum arm. The system can achieve improved relative payload capability and motion dexterity. Experimental results validate the performance of tendon-slacking avoidance and kinematics accuracy with different tip loading and tip positioning accuracy for aerial grasping.

14 Claims, 25 Drawing Sheets

(51) Int. Cl.
  *B25J 13/08*    (2006.01)
  *B64U 30/20*    (2023.01)
(58) Field of Classification Search
  CPC ................ B64U 30/20; B64U 2201/10; G05B
  2219/40234
  See application file for complete search history.

(56)    References Cited

U.S. PATENT DOCUMENTS

| | | | | |
|---|---|---|---|---|
| 2017/0312920 | A1* | 11/2017 | Yip ........................... | B25J 18/06 |
| 2018/0125591 | A1* | 5/2018 | Camarillo .............. | A61B 34/71 |
| 2019/0321971 | A1* | 10/2019 | Bosworth ............ | B25J 15/0028 |
| 2021/0055745 | A1* | 2/2021 | Lee ...................... | G01C 21/165 |
| 2024/0181630 | A1* | 6/2024 | Takagi ................... | B25J 9/1664 |

* cited by examiner (a)

(b)

(c)

(d)

AERIAL CONTINUUM MANIPULATOR WITH KINEMATICS FOR VARIABLE LOADING AND MINIMAL TENDON-SLACKING

CROSS-REFERENCE TO RELATED APPLICATION

This application claims the benefit of U.S. Provisional Application Ser. No. 63/363,228, filed Apr. 19, 2022, which is hereby incorporated by reference in its entirety including any tables, figures, or drawings.

BACKGROUND OF THE INVENTION

Unmanned aerial vehicles (UAVs) has attracted substantial interests into research and industrial communities for years. The functionalities are extended considerably when the UAVs are endowed with aerial manipulation skills for desired applications. Recently, aerial manipulation [1] has been an emerging research area in the field of aerial robotics. An aerial manipulator (AM) combines a conventional flying robot with specific robotic manipulator(s). The UAV provides a robust aerial platform in air for stable hovering or movement, while the manipulation mechanism conducts active operations. Many research studies have investigated different topics like physical interaction with environment [2]-[7], aerial grasping [8]-[11], and inspection and maintenance [12], [13]. In order to enhance robustness and stability, and broaden capabilities of the aerial manipulation systems, advanced techniques such as visual servo control [14], motion planning and trajectory tracking control [15], or interaction contact force control [16].

In terms of system structure, several prototypes of aerial manipulators [1], [17] are designed and validated both in actual experiments. For UAV platforms, the unmanned helicopter and multi-rotor UAV are two dominant types. Unmanned helicopters have advantages in aerial manipulation: large payload capacity to carry one or several multi-DOF manipulator(s), advanced capability of long-flying duration and long-distance flight to fulfil time-consuming operation tasks [18]-[27]. Nevertheless, owing to complex mechanisms and complicated aerodynamic characteristics [28], that cause difficulties in controller design, unmanned helicopters are difficult to operate precisely.

Compared with helicopter platforms, multi-rotor UAVs are more popular in aerial manipulation, due to the mechanical simplicity, easy-deployment flight controller design, low vibration, low cost, and flying dexterity in indoor and outdoor environments. A majority of research groups employ UAV platforms that are based on regular multi-rotor UAVs (e.g., quadrotor, hexarotor, and octo-rotor) [29]-[39]. Furthermore, the manipulation mechanism has two main categories: gripper and robotic manipulator. A gripper can be usually installed under the UAV fuselage, and located near the overall system center-of-mass (CoM), to conveniently conduct object grasping. Due to the light weight, minimal change of CoM, and minimal relative motion of grasped objects, grippers have little impacts on UAV dynamics [10], [40]-[46]. Robotic manipulators are more widely implemented and have many advantages as compared to simple grippers. The multi-DOFs contribute to expanding workspace, enriching numerous functionalities, and enhancing mission adaptability. It should be noted that most of AM research is based on multi-DOF manipulators, and various categories have been emerging to fulfil different requirements of aerial manipulation [2], [5], [25], [47]-[52], [52]-[55], as shown in FIG. 2.

However, although aforementioned systems' advantages and potential in aerial manipulation are evident, some critical issues of current aerial manipulators (AM) include:

1) Aerial platforms such as helicopters or octo-rotor UAVs generally fly in open outdoor environments instead of unstructured and restricted space, owing to relatively large weights, airframes and propellers. Lightweight UAV platforms can perform dexterous flights in a variety of environments.

2) On account of relatively low payload capacity, lightweight UAV platforms can only carry a gripper or a robotic manipulator with few DOFs. The platforms restrict the operation space and motion dexterity of the manipulators, and potential aerial applications are limited.

3) Once DOFs of manipulators are intended to increase, more actuators are needed, further increasing weights of traditional manipulators, and reducing payload capacity of the systems. Then, much more powerful and larger aerial platforms are required, like helicopters as discussed.

The conflicting relationship between the payload capacity and DOFs of current aerial manipulators restricts the improvement of aerial manipulation. The concept of an aerial continuum manipulator is recently proposed by Samadikhoshkho et al. [58] but the enablement of a functional continuum manipulator is lacking.

BRIEF SUMMARY OF THE INVENTION

Embodiments of the subject-invention can provide a manipulator comprising a multirotor and a continuum robotic arm. The multirotor can be a general unmanned aerial vehicle, while the continuum arm can be an emerging bio-inspired robotic system that could move like a tentacle. The continuum arm has high motion dexterity and the advantage of being lightweight. The whole system could conduct versatile tasks such as delivery, lifting, inspection and grabbing, etc. This can be very different from the existing conventional aerial manipulators that have limited degrees of freedom and dexterity.

Embodiments provide systems and methods to solve significant issues in the field of aerial manipulation. One main obstacle of the current aerial manipulators can be the conflict between the limited payload capacity of the multirotor and the flexibility of the robotic arm. As small UAVs have very limited payload capacity, that limits the degree of freedom (DOF) of the robotic arm. The low DOF can significantly restrict the flexibility of the robotic arm, and this has limited the extensive use of these aerial manipulators in industries.

Embodiments can combine a flexible continuum arm with a multirotor to provide flexible aerial manipulation. The continuum arm has 5 DOF while its weight can be even smaller than a 2 DOF conventional robotic arm. Certain embodiments provide a tendon-driven continuum arm having a high payload bearing ability among all continuum arms. Further, continuum arms have high (e.g., approaching, practically or effectively, infinite) DOFs due to its elastic motion including bending, extension and torsion.

Embodiments can be lighter than the existing aerial manipulators, but can provide more payload capacity, offering many more benefits compared to related art solutions, that will enable the massive use of aerial manipulators for various tasks in smart cities such as bridge inspection, powerline inspection, and aerial painting.

Embodiments can provide a novel aerial continuum robotic arm, comprising a novel mechanical structure design that results in lightweight while maintaining sufficient loading capacity.

Related art continuum arms use very heavy actuation systems (e.g., over 3 kg), which inhibits performance on payload-restricted robotic platforms such as UAVs. Embodiments of the subject invention can provide a light but flexible continuum arm advantageously optimized for use on various platforms such as UAVs. Specifically, embodiments can provide a weight of the whole continuum arm part of 60 g with a 1 kg grip force and 2 kg lifting payload capacity. In certain embodiments, the mass of continuum arm can be less than 100 g, alternatively less than 80 g, or less than 70 g, 60 g, or 50 g, including increments, ranges, and combinations thereof. Certain embodiments can provide a grip force (e.g., represented in kilograms) that is more than 5 times the weight of the continuum arm assembly, alternatively more than 10, 15, or 20 times the weight of the continuum arm assembly, including increments, ranges, and combinations thereof. Certain embodiments can provide a lifting payload capacity (e.g., represented in kilograms) that is more than 5 times the weight of the continuum arm assembly, alternatively more than 10, 15, 20, 30, or 40 times the weight of the continuum arm assembly, including increments, ranges, and combinations thereof. Also, embodiments can provide improved flexibility by large or effectively infinite degrees of freedom in the continuum mechanism, e.g., greater than 1 degree of freedom in the motion of the continuum arm mechanism, alternatively greater than 2 degrees of freedom, or greater than 3, 4, 5, 6, or more degrees of freedom in the motion of the continuum arm mechanism. In certain embodiments, the mass of actuation motors can be 20 g, alternatively less than 30 g, or less than 50 g, 40 g, or 25 g, including increments, ranges, and combinations thereof. In certain embodiments, the mass of tendons can be small enough to be effectively neglected in an analysis of dynamics and control of the continuum arm or of the aerial continuum manipulator (AeCoM) system, e.g., less than 5 g, 1 g, 0.5 g, or 0.1 g, including increments, ranges, and combinations thereof.

In related art, tendon-driven continuum arms can suffer from cable slack. Embodiments provide a cable slack inhibition system in the software perspective that has been shown to successfully inhibit cable slack without introducing additional weight to the arm.

Related art aerial manipulators have low loading capacity, which leads to limited aerial applications, and are restricted by degrees of freedom, which results in low motion dexterity.

A tendon-slacking problem exists in continuum robotic arms. It affects the continuous motion and accuracy of the manipulators.

Embodiments can reduce the weight of the robotic arm part, to improve loading capacity, by mechanical optimization and meta-analysis.

Embodiments can provide a bio-inspired and lightweight manipulator to improve the dexterity of the end-effector to deal with complex applications and introduce a sensor-feedback control method to avoid, minimize, or reduce the general tendon-slacking problem for continuum robotic arms. In certain embodiments, the bio-inspiration can be dependent on a motion rule, such as tentacles. Its property of lightweight (e.g., only 60 g) is proved due to the comparison with traditional continuum manipulator, which has large mass (e.g., over 2 kg). Large or effectively infinite DOFs leads to high dexterity of the provided manipulator. When the angular velocity exceeds 30 degrees per second, the tendon slacking occurs frequently among related art tendon-driven continuum robots. Certain embodiments inhibit tendon slacking by introducing the tension sensors to assist in controller design. Embodiments have been shown to move in 45 degrees per second rotary velocity along a 26.5 cm radius arc without tendon slacking while the maneuver continuity is maintained.

Embodiments can provide a flight controller to handle disturbances and keep good performance of positioning control, and a robust kinematics model for the continuum manipulator under varying tip-loading. Embodiments can engage in agricultural applications like fruit retrieving, industrial applications such as bridge inspection, rescue, maintenance, and other complex tasks.

Embodiments can provide a novel robotic manipulator comprising continuum robots. A continuum robot can be defined as a continuously bending, high-degree-of-freedom robot with an elastic structure [56]. A key advantage of continuum robots over conventional manipulators composed of several rigid links, is that their weight is considerably lower for the same maximum output force. Moreover, continuum robots have increased flexibility, and thereby dexterity, thanks to the property of high (e.g., approaching, practically, or effectively infinite) DOFs [57].

Related art (e.g., Samadikhoshkho) only presents a continuum robot simulation model based on the concept but enabling hardware or mechanism design is not provided. Compared with the related art, the proposed aerial continuum system (AeCoM) has been physically manufactured, by novel methods using, novel mechanisms, thus providing the capability for difficult aerial grasping operations used to validate the system. Embodiment of the subject invention have applied novel systems and methods to achieve more solid and practical validation results than any related art system.

One critical algorithm advantageously applied in certain embodiments is the novel sensor-based kinematics model, which can address the issue of low accuracy of the conventional kinematics model (as presented in related art) under variable loadings. Embodiments can employ an attitude sensor to assist in the kinematics model design, and experimental results show exceptional accuracy of the model even during aggressive maneuvers. However, related art does not evaluate their kinematics model's accuracy during manipulator motions. Further, related art has failed to show that the results based on a simulative system provide sufficient precision for demanding real world applications. The highest known precision which related art works could provide, is more than 10 cm. For actual applications such as aerial grasping, the error should be less than 3 cm. Embodiments of the provided AeCoM can achieve 2 cm precision for EE position and 0.1 degree error for EE pose angles, due to the sensor-based kinematics model, under 500 g payload. Alternatively, embodiments can provide 5 cm, 4 cm, 3 cm, 2.5 cm, 1.5 cm, or 1 cm precision of position, including ranges, combinations and fractions thereof, together with 1 degree, 0.8 degree, 0.6 degree, 0.4 degree, 0.2 degree, 0.05 degree error for EE pose angles, including ranges, combinations and fractions thereof, under 500 g payload.

Another algorithm advantageously applied in certain embodiments is the novel manipulator controller for tendon-slacking inhibition. The issue of tendon-slacking is common in studies of continuum robots. The fast motion and variable loading are the main reasons. Embodiments provide a cascade closed-loop controller with incorporation of an attitude sensor and tension sensors. Experimental results demonstrate that the controller enables the AeCoM to conduct fast motions without measurable tendon-slacking. In certain embodiments fast motion can be defined as the bending motion with more than 10 degree per second angular velocity. The tendon slacking can be defined as when the excess length is more than 1 cm on a given tendon. Related art does not discuss the performance of fast motions using their controller, and the published simulation results are not sufficient to enable application of related art models.

Moreover, aerial grasping for real objects can be conducted by certain embodiments to validate the overview performance of the proposed aerial system, such as system integrity, motion robustness and system feasibility. Related art has not enabled nor provided validation results for aerial manipulation.

DETAILED DISCLOSURE OF THE INVENTION

Figure 1:
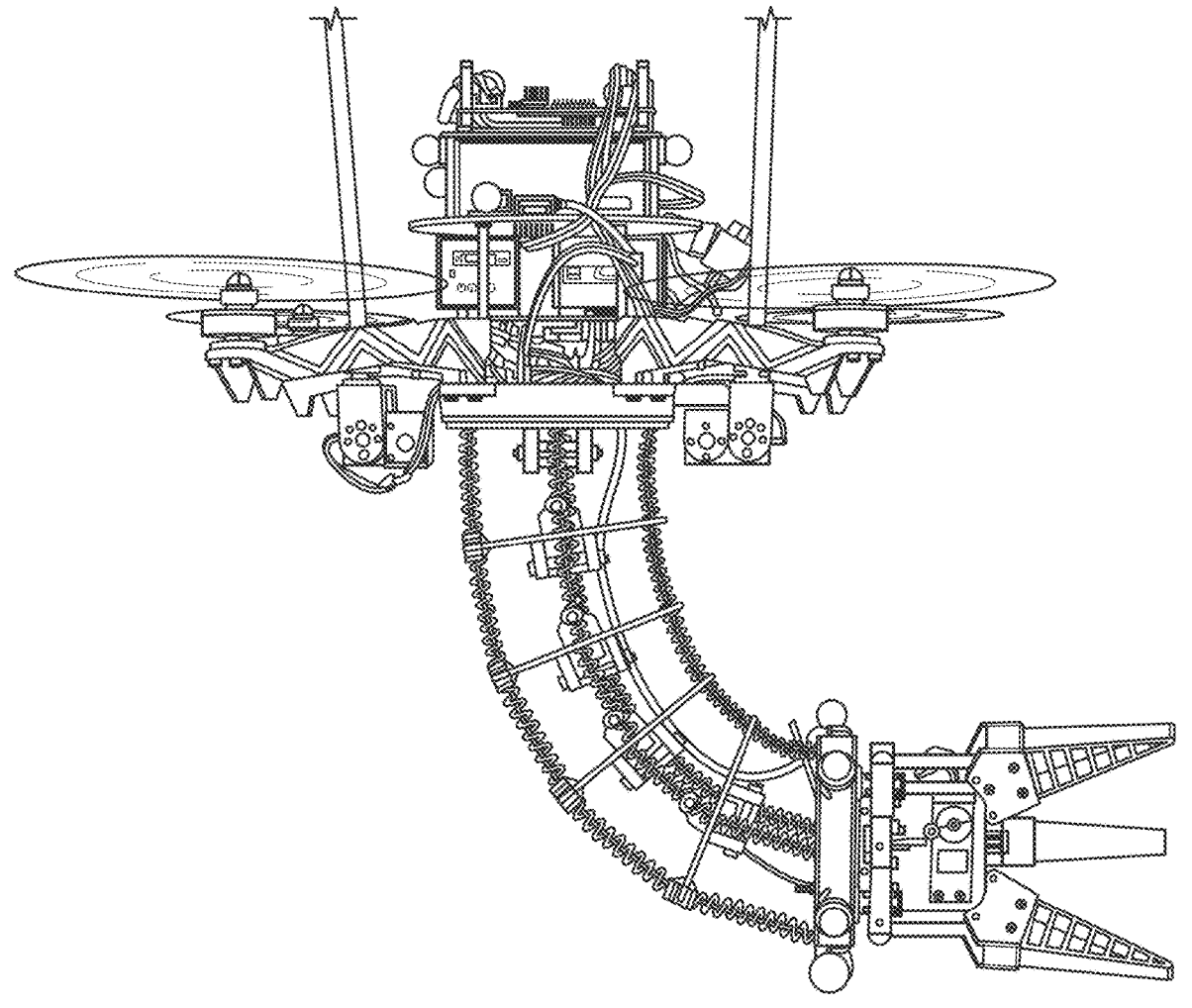
FIG. 1 Is a photograph of an aerial continuum manipulator (AeCoM) conducting aerial manipulation tasks and grasping operations, in accordance with an embodiment of the subject invention.
Figure 2A:
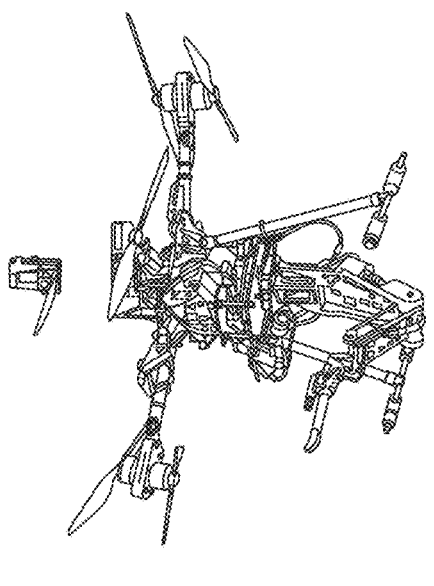
FIG. 2 Shows several examples of related art aerial manipulators. In row (a) a helicopter or rotorcraft carries a multi-link manipulator with several DOFs. In row (b) a helicopter or rotorcraft carries a gripper. In row (c) a rotorcraft is equipped with a particular manipulator for special manipulation tasks.
Figure 2A:
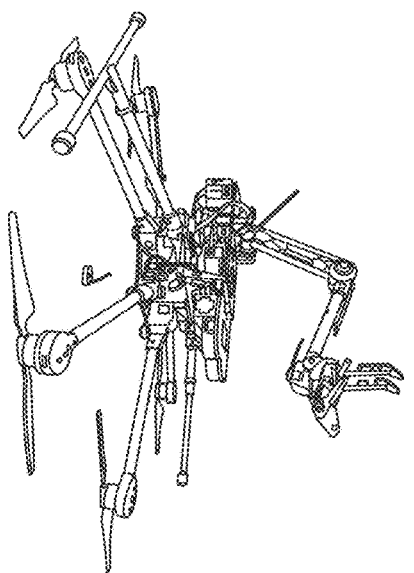
Figure 2A:
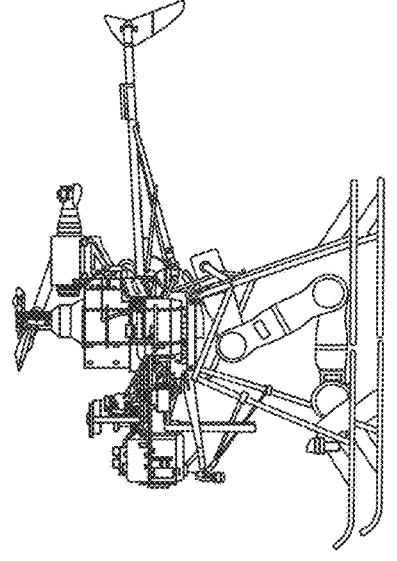
Figure 2B:
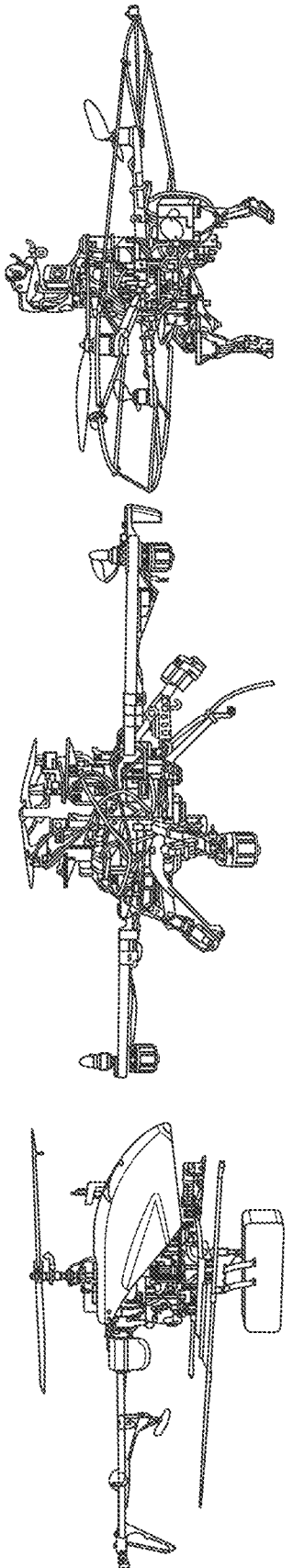
Figure 2C:
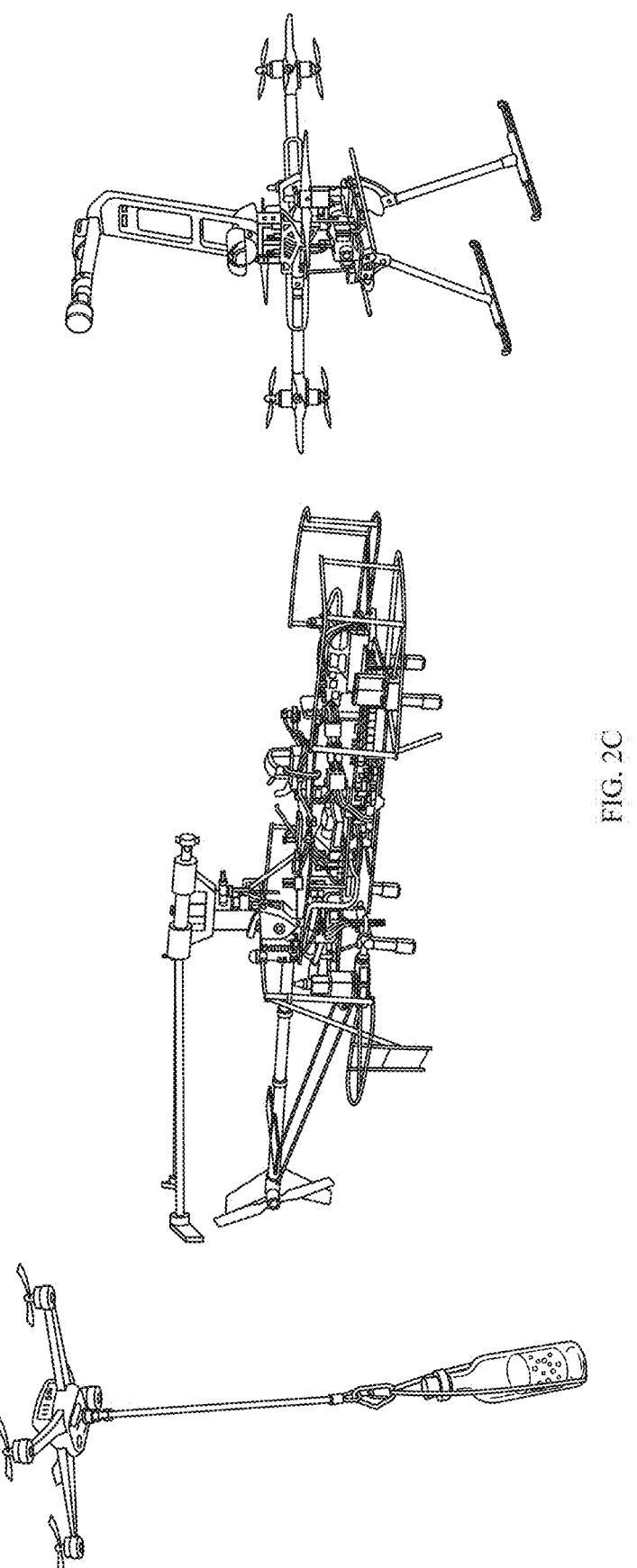

All patents, patent applications, provisional applications, and publications referred to or cited herein are incorporated by reference in their entirety, including all figures and tables, to the extent they are not inconsistent with the explicit teachings of this specification.

Following are embodiments that illustrate procedures for practicing the invention. These examples should not be construed as limiting.

Embodiment 1. An aerial continuum manipulator (AeCoM) system comprising:

an unmanned aerial vehicle (UAV) subsystem comprising:

a first multiplicity of motors mounted to the UAV and configured to generate thrust via a multiplicity of rotors, a first inertial measurement unit (IMUA) aligned with the UAV and configured to measure an attitude of the UAV, and a UAV controller (UAVC) configured to control the attitude of the UAV; and a tendon driven continuum robotic manipulator (CRM) subsystem comprising:

a CRM base mounted to the UAV, a CRM end-effector (EE) opposite the CRM base, one or more CRM sections between the CRM base and the EE, a multiplicity of tendons configured to activate the CRM, a second multiplicity of motors configured to generate tension in the multiplicity of tendons, a multiplicity of tension sensors configured to sense tension in the multiplicity of tendons, a second inertial measurement unit (IMUE) aligned with the EE and configured to measure a pose of the EE, and a CRM controller (CRMC) configured to control the pose of the EE; and a primary controller (PC) connected to both the UAVC and the CRMC;

wherein the PC is configured to receive the attitude of the UAV and send a UAV control signal to the UAVC, and wherein the PC is configured to receive the pose of the EE and send a CRM control signal to the CRMC.

Embodiment 2. The AeCoM system according to Embodiment 1 wherein the PC is configured to receive the attitude of the UAV and send a UAV control signal to the UAVC.

Embodiment 3. The AeCoM system according to Embodiment 2 wherein the PC is configured to calculate each of the CRM control signal and the UAV control signal, respectively, through a control scheme comprising a kinematics model based on constant-curvature geometrical mapping.

Embodiment 4. The AeCoM system according to Embodiment 3 wherein the PC is configured to calculate each of the CRM control signal and the UAV control signal, respectively, through a closed-loop control method configured to minimize tendon slacking.

Embodiment 5. The AeCoM system according to Embodiment 4 wherein the closed-loop control method uses the pose of the EE, the attitude of the UAV, and a multiplicity of tension sensor feedback signals from the multiplicity of tension sensors to calculate each of the CRM control signal and the UAV control signal.

Embodiment 6. The AeCoM system according to Embodiment 4 wherein the closed-loop control method builds an attitude-rate-tension cascade closed loop control, comprising the EE pose for solving a task space, an EE rate for deciding a maneuver velocity, and the multiplicity of tension sensor feedback signals for slacking inhibition.

Embodiment 7. The AeCoM system according to Embodiment 4, further comprising:

a first control board comprising the UAVC;

a second control board comprising the CRMC, the second control board physically separated from the first control board;

a third control board comprising the PC, the third control board physically separated from both the first control board and the second control board.

Embodiment 8. The AeCoM system according to Embodiment 7 wherein the PC connects to the UAVC through a first serial port, and the PC connects to the CRMC through a second serial port.

Embodiment 9. The AeCoM system according to Embodiment 8 wherein the UAVC does not connect to the CRMC directly, and the UAVC is only connected to the CRMC through the PC.

Embodiment. The AeCoM system according to Embodiment 4 wherein the UAVC and the PC each are on a common control board, and the CRMC is on a remote control board physically separated from the common control board.

Embodiment 11. The AeCoM system according to Embodiment 4 wherein the UAVC, the CRMC, and the PC each are on a comprehensive AeCoM control board.

Embodiment 12. The AeCoM system according to Embodiment 11 wherein the IMUA is on the comprehensive AeCoM control board.

Embodiment 13. The AeCoM system according to Embodiment 11 wherein the IMUA is not on the comprehensive AeCoM control board.

Embodiment 14. A method for controlling an end-effector (EE) pose of an aerial continuum manipulator (AeCoM) system having an unmanned aerial vehicle (UAV), a tendon driven continuum robotic manipulator (CRM) mounted on the UAV, the EE mounted on the CRM, a first inertial measurement unit (IMUA) mounted on the UAV, a second inertial measurement unit (IMUE) mounted on the EE, and a multiplicity of tension sensors mounted on the CRM; the method comprising:

receiving, by a first processor, a kinematics model based on constant-curvature geometrical mapping of at least the CRM, the kinematics model comprising an EE pose, a UAV attitude, and a multiplicity of tension values;

receiving, by the first processor, a desired EE pose, a current EE pose, a current UAV attitude, and a current multiplicity of tension values;

calculating, by the first processor, using the kinematics model, a closed loop control solution to reduce an error between the current EE pose and the desired EE pose while minimizing a measure of tendon slacking in the CRM, the closed loop control solution comprising a UAV attitude command signal and an EE pose command signal;

sending, by the first processor, the UAV attitude command signal to a second processor;

sending, by the first processor, the EE pose command signal to a third processor;

controlling, by the second processor, the UAV attitude; and controlling, by the third processor, the EE pose relative to the UAV attitude, to control the EE pose of the aerial continuum manipulator (AeCoM) system.

Embodiment 15. The method according to Embodiment 14, wherein the calculating comprises an attitude-rate-tension cascade closed loop control, using the EE pose for solving a task space, an EE rate for-deciding a maneuver velocity, and the multiplicity of tension values for slacking inhibition.

Embodiment 16. The method according to Embodiment 15, the controlling, by the second processor, the UAV attitude, comprising two loops: position and velocity control in an outer loop, and attitude control in an inner loop.

Embodiment 17. The method according to Embodiment 15, the controlling, by the third processor, the EE pose relative to the UAV attitude, comprising three consecutive control layers.

Embodiment 18. The method according to Embodiment 17, the three consecutive control layers comprising an innermost layer having tension constraints for controlling each motor, to restrict lowest tension for each tendon and reduce tension loss and tendon slacking.

Embodiment 19. An aerial continuum manipulator (Ae-CoM) system comprising:

an unmanned aerial vehicle (UAV) subsystem comprising:

a first multiplicity of motors mounted to the UAV and configured to generate thrust via a multiplicity of rotors, a first inertial measurement unit (IMUA) aligned with the UAV and configured to measure an attitude of the UAV, and a UAV controller (UAVC) configured to control the attitude of the UAV; and a tendon driven continuum robotic manipulator (CRM) subsystem comprising:

a CRM base mounted to the UAV, a CRM end-effector (EE) opposite the CRM base, one or more CRM sections between the CRM base and the EE, a multiplicity of tendons configured to activate the CRM, a second multiplicity of motors configured to generate tension in the multiplicity of tendons, a multiplicity of tension sensors configured to sense tension in the multiplicity of tendons, a second inertial measurement unit (IMUE) aligned with the EE and configured to measure a pose of the EE, and a CRM controller (CRMC) configured to control the pose of the EE; and a primary controller (PC) connected to both the UAVC and the CRMC;

wherein the PC is configured to receive the attitude of the UAV and send a UAV control signal to the UAVC;

wherein the PC is configured to receive the pose of the EE and send a CRM control signal to the CRMC;

wherein the PC is configured to receive the attitude of the UAV and send a UAV control signal to the UAVC;

wherein the PC is configured to calculate each of the CRM control signal and the UAV control signal, respectively, through a control scheme comprising a kinematics model based on constant-curvature geometrical mapping and a closed-loop control method configured to minimize tendon slacking;

wherein the closed-loop control method uses the pose of the EE, the attitude of the UAV, and a multiplicity of tension sensor feedback signals from the multiplicity of tension sensors to calculate each of the CRM control signal and the UAV control signal; and wherein the closed-loop control method builds an attitude-rate-tension cascade closed loop control, comprising the EE pose for solving a task space, an EE rate for deciding a maneuver velocity, and the multiplicity of tension sensor feedback signals for slacking inhibition.

Embodiment 20. The AeCoM system according to Embodiment 19, further comprising:

a first control board comprising the UAVC;

a second control board comprising the CRMC, the second control board physically separated from the first control board;

a third control board comprising the PC, the third control board physically separated from both the first control board and the second control board;

a first serial port on the PC connecting to the UAVC; and a second serial port on the PC connecting to the CRMC.

In certain embodiments, the PC can serve as a core component of the system, because it can connect to the UAV flight controller (UAVC) to exchange the UAV attitude information (from the IMUA) and flight control commands. The PC also can communicate with the microcontroller (CRMC) that controls the motion or pose of the manipulator or end-effector (EE). The PC can collect sensing information from the UAVC and CRMC. The PC can compute a precise sensing-based kinematics model to generate an accurate EE pose. The communication channels to and from any of the UAVC, CRMC, or PC can be through USB serial ports.

The closed-loop control method can use IMUA attitude, IMUE pose, and tension sensors feedback. The method can build an attitude-rate-tension cascade closed loop control, which can involve the end-effector's attitude for solving task space, the end-effector's rate for deciding maneuver velocity and tendon tensions for slacking inhibition.

Figure 15:
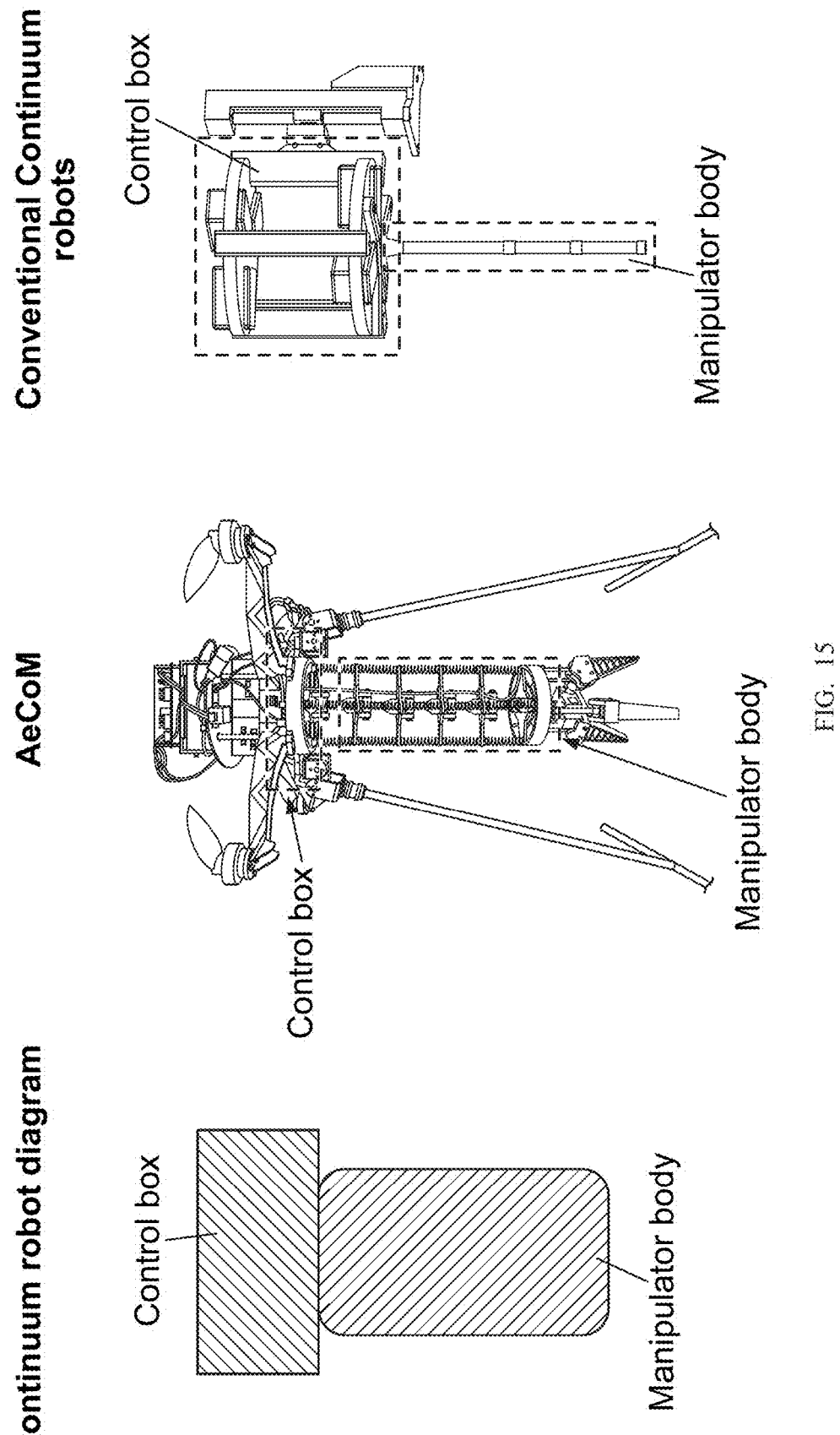
FIG. 15 Presents qualitative results of continuum robots for explaining the layout including the control box and the manipulator body. The continuum robot diagram shows a general relation between the control box and the manipulator body. Embodiments of the provided AeCoM reach a very low ratio, while related art or conventional continuum robots have a large ratio of control box volume to manipulator volume.
Figure 16:
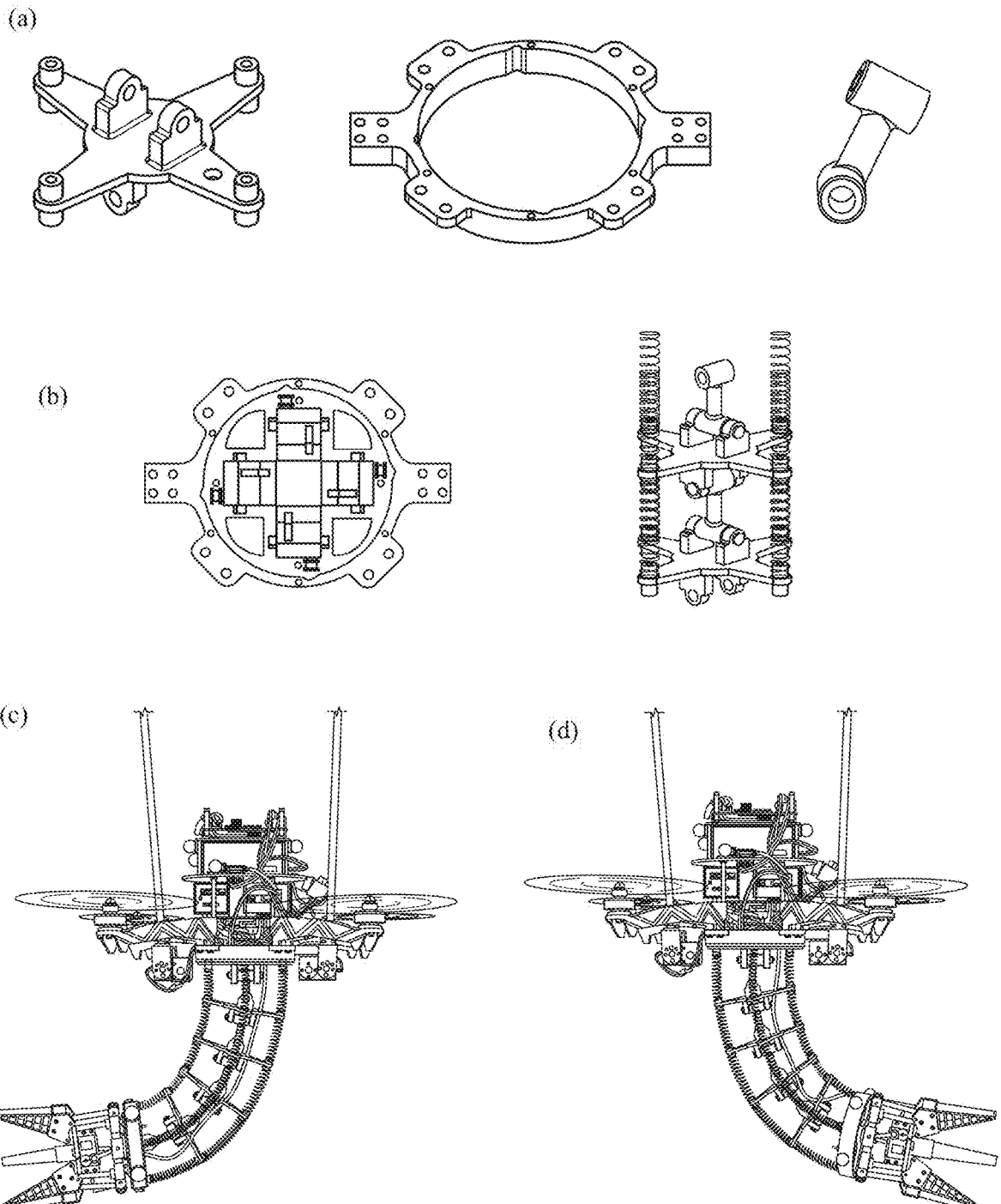
FIG. 16 Depicts mechanical system architecture of a continuum robotic manipulator, in accordance with an embodiment of the subject invention. (a) Individual components. (b) Assembly of one level base and two levels together. (c) Mechanism structure of the AeCoM and continuum robotic arm flexed to the left. (d) Mechanism structure of the AeCoM and continuum robotic arm flexed to the right.

For most continuum robots, the ratio of the control box volume to the whole body is more than 0.65, while the ratio in certain embodiments of the subject invention can be only 0.1, alternatively 0.01, 0.05, 0.2, 0.3, 0.4, 0.5, 0.6, or 0.64, including ranges or combinations thereof and alternatively less than or more than any of the preceding values, ranges, or combinations. To define the ratio, it is necessary to determine the definition of the control box and the whole robot, as shown in FIG. 15. The control box is the remote actuation center, which incorporates all the motors for controlling tendons. The whole robot is composed of the control box and the manipulator body. The aforementioned value is the ratio of the control box's volume to the manipulator body's volume. In certain embodiments, the provided AeCoM reduces the ratio to only 0.1, because of the highly compacted mechanism design for the control box part. The lightweight, small-volume and powerful motor is the key factor, and the relative structure is also tailored for the layout. In certain embodiments, the mass of UAV controller, continuum robot micro-controller and PC can be 15 g, 10 g, and 40 g, or less, respectively. For volume, their measurement can be 0.1 $cm^3$, 0.05 $cm^3$ and 36 $cm^3$, or less, respectively.

Advantageously leveraging the measurement feedback of the IMUA, IMUE, and tension sensors, the closed-loop control method can control the attitude, motion velocity and tendon tensions of the proposed continuum robot. Therefore, for aggressive bending motions, the control method can adaptively raise the control response and maintain tendon tensions for inhibiting tendon-slacking.

Materials and Methods

Embodiments of the subject invention address the technical problem of difficulty in control of end-effector pose in continuum robots, and particularly aerial continuum robots. This problem is addressed by providing a closed-loop control method that can use arial platform attitude, end-effector pose, and tension sensors feedback; wherein in some embodiments the method can build an attitude-rate-tension cascade closed loop control, which can involve the end-effector's attitude for solving task space, the end-effector's rate for deciding maneuver velocity and tendon tensions for slacking inhibition.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for size ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg. When either precision or error are used herein, it is understood to mean the absolute value of the total precision or error, unless otherwise specified.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1—Design and Manufacture of an Aerial Continuum Manipulator (AeCoM)

This example includes the design and manufacture of an improved aerial continuum manipulator (AeCoM) in accordance with an embodiment of the subject invention that is composed of a lightweight quadrotor platform and a continuum robotic manipulator with one single section. FIG. 1 shows this AeCoM conducting aerial object grasping. The weight of this UAV platform is 750 g, and its size is 320 mm long, by 320 mm wide, by 400 mm in height. The manipulator whose weight is only 60 g, is tendon-driven and has one single section. One key distinction between the provided continuum part and related art tendon-driven continuum robots is that this embodiment advantageously employs lightweight, small-volume and powerful actuation motors (Model: FeeTech-STS3032, Manufacturer name: Shenzhen Feetech RC Model Co.,Ltd) rather than extremely heavy and large controlling units. Thus, the designed continuum manipulator that is carried by the UAV platform, can be floating in air instead of being fixed and stationary. The highly compact mechanism design enables the UAV platform and the continuum manipulator to be combined to form a novel integrated system.

Kinematics modeling plays an important role in the development of embodiments of the provided aerial manipulator. The accuracy of end-effector (EE) pose that is derived from the kinematics model, has direct impacts on the performance of aerial manipulation tasks: However, traditional constant-curvature kinematics widely used in continuum robots, fails to provide precise deformation of the manipulator under variable loadings, due to versatile EE devices such as grippers, sensors and other tools, kinematic analysis can be complicated for continuum controller design and shape estimation. Data-driven techniques [59]-[61], sensor-feedback methods [62], [63], and mathematical models [64], [65] have been investigated to improve continuum kinematics under different loadings. To achieve better kinematics performance for the AeCoM, embodiments can incorporate an Inertial Measurement Unit (IMU) sensor installed at the EE tip (or at another advantageous location) to assist in kinematics modeling. Results show that the error of EE position estimation is less than 3 mm within the range of loading between 0 g and 500 g.

With the designed kinematics model, the continuum manipulator critically suffers tendon slacking during bending motion, even for most continuum robots. Such tendon loosening harmfully affects the controller accuracy and motion continuity. Typically for AeCoM, during aggressive maneuvers or challenging aerial manipulation tasks, the risk of tendon slacking rises dramatically. To address the issue of tendon slacking, researchers have investigated many approaches, which can be categorized in three aspects: mechanical design [66]-[71], sensor assistance [72]-[75] and numerical models [76]-[78]. Nevertheless, mechanism structures can require extra weight and increase the system complexity. Even though the tendon tension is maintained to inhibit tendon slacking, in some cases sensors are additionally installed, increasing weight and complexity. Based on numerical models that provide shape estimation of continuum robots, controller outputs can be adapted to ensure tension maintenance. However, the models are limited (e.g., owing to relying on parameters of the materials.) For the inhibition of tendon slacking, embodiments provide a cascade sensor-feedback controller for the continuum manipulator to implement real time attitude control, even in fast motions. Experiments validate that the attitude tracking of EE has extremely low error during consecutive aerial motions, without measurable or harmful tendon slacking.

To prove the feasibility of the AeCoM, several experiments are conducted, including the validation of payload capacity and motion ability, the verification of the aerial continuum kinematics model and the controller for tendon slacking inhibition. Aerial grasping is also conducted to verify the overall performance of the provided system. Elements of this example include:

1) A novel aerial manipulation system comprising an aerial continuum manipulator (AeCoM), with original mechanical design. The system has advantages of motion dexterity and payload capacity over conventional aerial manipulators.

2) With incorporation of a sensor IMU, a specific kinematics model based on constant-curvature geometrical mapping is provided, under variable loadings. Experiments of aerial bending motion and object grasping are conducted to prove distinct accuracy.

3) By employing the IMU and torque sensors, a closed-loop control method is derived to inhibit tendon slacking during aggressive bending motion.

The structural design of the aerial continuum system is presented in EXAMPLE 2.

The kinematic model and dynamic model are detailed in EXAMPLE 3.

The control method for the system is illustrated in EXAMPLE 4.

Experimental results are included in EXAMPLE 5.

EXAMPLE 6 summarizes the prior examples.

Example 2—DESIGN

The model can provide an overview system architecture divided into hardware design and mechanical design, is illustrated in detail, and comparison with conventional aerial manipulators is presented.

The hardware system is designed in order to build a solid basis of a complete and integrated control system. Embodiments separate the whole aerial system into three subsystems: automatic flight decision system, aerial flight platform, and continuum robotic system. The decision system is mainly an onboard high-performance PC, that is responsible for receiving and processing sensing information, and generating motion commands. The aerial platform is a quadrotor using an opensource flight controller board and motors with high pay load capability. The continuum robotic system involves an independent microcontroller board as the core, tension sensors, an IMU, and several functional servo motors. The latter two subsystems directly connect to the onboard PC via serial ports, that form stable communication systems. Key hardware components with detailed models are listed in Table. I.

TABLE I

LIST OF KEY SYSTEM COMPONENTS

| Hardware components | Quantity | Model |
|---|---|---|
| Onboard PC | 1 | Dji manifold-v2 |
| Flight controller | 1 | PixRacer-micro |

TABLE I-continued

LIST OF KEY SYSTEM COMPONENTS

| | | |
|---|---|---|
| Propeller motors | 4 | T-motor F90 |
| Micro cortex-3 arm board | 1 | Stm32F1VCT6 |
| Tendon motors | 4 | FeeTech-STS3032 |
| USB-TTL communication board | 1 | FeeTech-URT1 |
| IMU sensor | 1 | MPU9250 |
| Digital servo motors for landing | 2 | RDS3115 |
| Servo motor of the gripper | 1 | WeeTech-HWZ020 |

| Mechanism (material) | Quantity | Weight (each) |
|---|---|---|
| Base disk (PLA) | 1 | 5 g |
| Intermediate disk (PLA) | 4 | 3 g |
| End disk (PLA) | 1 | 4 g |
| Joint shaft (PLA) | 5 | 2 g |
| Pin shaft (Metal) | 10 | 1 g |
| Supporting spring (Metal) | 20 | 0.5 g |
| Actuation motor (Hybrid) | 4 | 20 g |
| Landing rod (Carbon) | 2 | 4 g |
| Quadrotor frame (Plastics) | 1 | 30 g |

To incorporate a continuum robotic system into an aerial platform, the entire weight, payload capacity and control accuracy or dexterity should be considered. In order to reduce the weight as light as possible, soft material is first taken into account. Despite of the property of light weight, soft material has the deadly drawback that its stiffness is not large enough, such that the whole soft manipulator cannot bear heavier objects. Under this situation, its payload capacity is severely limited, and also the soft material is mostly driven by pneumatic pumps, that are too heavy for the aerial system. Therefore, instead of pneumatic driving, this embodiment deploys a tendon-driven system, that is actuated by several motors. Moreover, this embodiment uses 3D-printing material to produce certain mechanical components of the continuum robotic arm.

Figure 3:
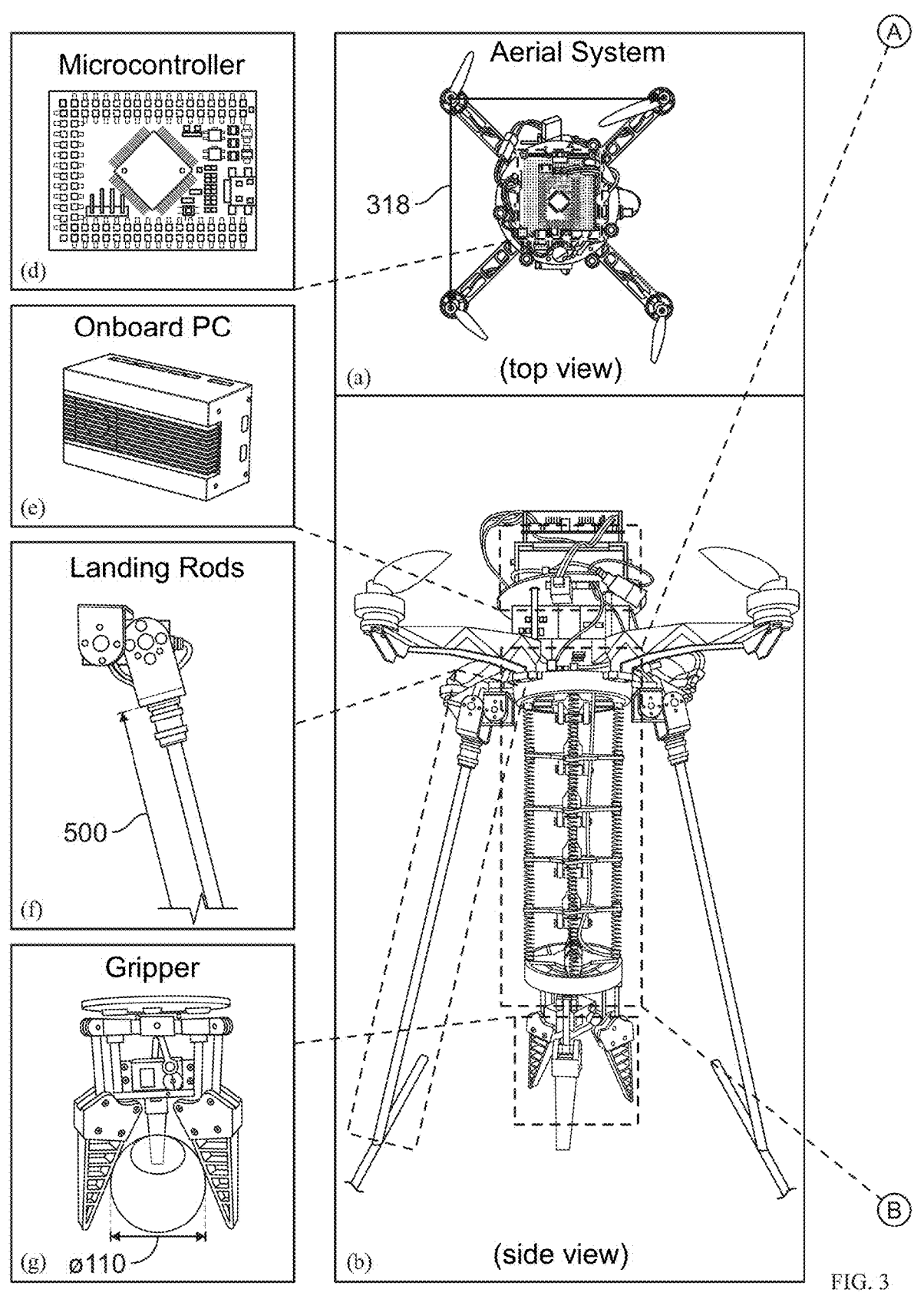
FIG. 3 Depicts mechanical system architecture of an AeCoM, in accordance with an embodiment of the subject invention through multiple views, detail views, subassembly views, and component views. (a) Top view of the AeCoM. (b) Side view of the AeCoM. (c) Mechanism structure of the continuum robotic arm. (d-o) Key elements, subassemblies, and components of the AeCoM.
Figure 3:
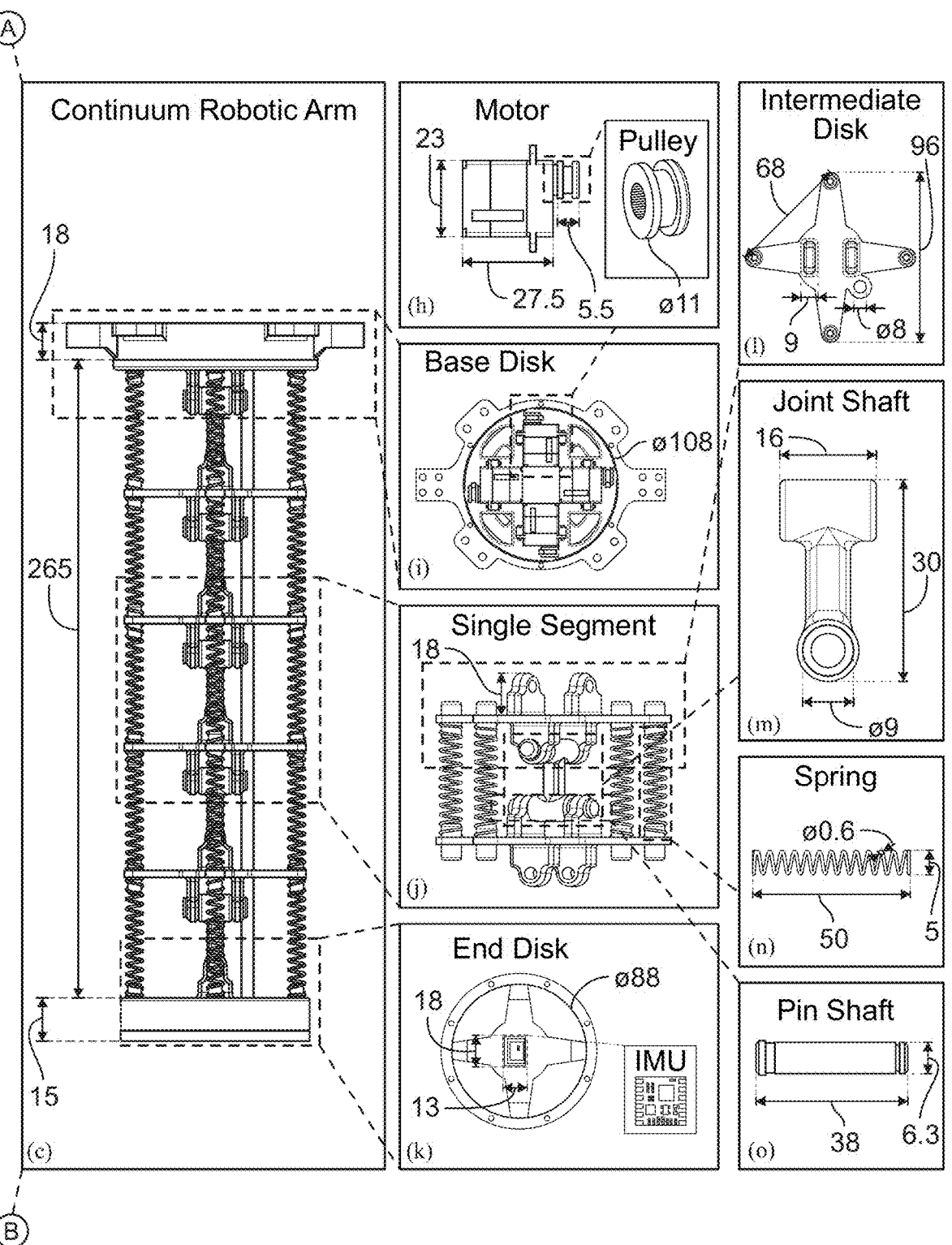

To achieve larger workspace, the prototype consists of five identical segments assembled consecutively to extend its bending range, forming one single continuum section, as shown in FIG. 3, panel (c). The Aerial System can have a rotor separation of 318 mm (alternatively, between 150 and 600 mm) on each of four sides. The landing rods can have a length of 500 mm (alternatively, between 200 and 1000 mm) on each side. The gripper can have a gripping diameter of 110 mm (alternatively, between 50 and 250 mm) on each of four sides. The motor installation base (1) can have a body height of 18 mm alternatively, between 9 and 36 mm). The motion segment assembly can have a total height of 265 mm (alternatively, between 130 and 530 mm) from top to bottom. The end disk (4) can have a body height of 15 mm (alternatively, between 7 and 30 mm). The motors (6)can have a height of 27.5 mm (alternatively, between 13 and 55 mm). The motors can have a length of 23 mm (alternatively, between 11 and 46 mm). The motors can have a spool height of 5.5 mm (alternatively, between 3 and 11 mm). The motors can have a spool diameter of 11 mm (alternatively, between 5 and 22 mm). The intermediate disk can have a tip to tip distance of 96 mm (alternatively, between 48 and 192 mm) across opposite arms. The intermediate disk can have a tip to tip separation of 68 nm (alternatively, between 34 and 136 mm) between adjacent arms. The intermediate disk can have a guide hole diameter of 8 mm (alternatively, between 4 and 16 mm) at and offset location. The intermediate disk can have a gimble mount boss thickness of 9 mm (alternatively, between 4 and 18 mm). The intermediate disk can have a gimble mount boss height of 18 mm (alternatively, between 93 mm). The joint shaft or gimble can have an overall height of 30 mm (alternatively, between 15 and 60 mm) from top to bottom. The base disk (5) can have a diameter of 108 mm (alternatively, between 54 and 216 mm). The end disk (4) can have a diameter of 88 mm (alternatively, between 44 and 176 mm. The IMU can have a width of 13 mm (alternatively, between 6 and 26 mm). The IMU can have a length of 18 mm (alternatively, between 9 and 36 mm). The spring (9), in each respective segment can have a free length of 50 mm (alternatively, between 25 and 100 mm). The spring (9) can have a coil major diameter of 5 mm (alternatively, between 2 and 10 mm). The spring (9) can have a wire diameter of 0.6 mm (alternatively, between 0.3 and 1.2 mm). The pin shaft (8) can have a length of 38 mm (alternatively, between 19 and 76 mm). The pin shaft (8) can have a diameter of 6.3 mm (alternatively, between 3 and 13 mm).

Each segment is composed of two cross disks, that are connected by a mechanical gimbal, and four springs evenly distributed in each disk as support structures. The bending motion is actuated by four tendons that are driven by four motors with torque feedback. One key factor of design and production of the manipulator is the usage of a specific motor (e.g., Model: FeeTech-STS3032, Manufacturer name: Shenzhen Feetech RC Model Co.,Ltd) having a weight of only 20 g. In addition, each motor could provide a maximum torque of 3.5 N m, and its volume is 0.15 $cm^3$. Due to distinct mechanical properties, the motors facilitate optimization of the system structural layout where the actuation part of the robotic arm is compacted into a highly limited space, and also supply with necessary actuation for satisfying different complicated motions.

Regarding to the space distribution of four actuation motors or tendons, one pair of diagonal tendons manipulate the robotic arm's bending motion within the plane of the tendons, while the other diagonal tendons control the perpendicular bending motion. From the perspective of mechanical design, the gimbal only restricts two DOFs of rotation motion, such that there is no twist moment generated during the manipulator's motion. Therefore, the bending motions triggered by the two pairs of diagonal tendons that are strong fishing line (Model: DANGAN BRAIDX #0.6 mm 12 lb, Country: Japan) are totally independent. Considering accurate end-effector (EE) pose estimation, embodiments can employ an IMU sensor that is installed centrally on the EE tip, to obtain real-time and precise attitude information, as shown in FIG. 3, panel (k). The roll axis is corresponding to one of the two pairs, and the pitch axis aligns to another of the two pairs, such that the bending motion can be detected by IMU's attitude changes. Discussing the structural layout, every component is evenly distributed around the center line of the whole system, which leads to the best weight balance.

Compared with previous continuum robots with similar structures, the provided design uses optimized cross-sectional disks (Model: Raise3D, Material: PLA 1.75 mm) instead of solid circular disks to reduce unnecessary weight of the disks, and maintain enough structural strength. Table. I presents information of each detailed mechanical element, including quantity, weight, material.

Figure 4:
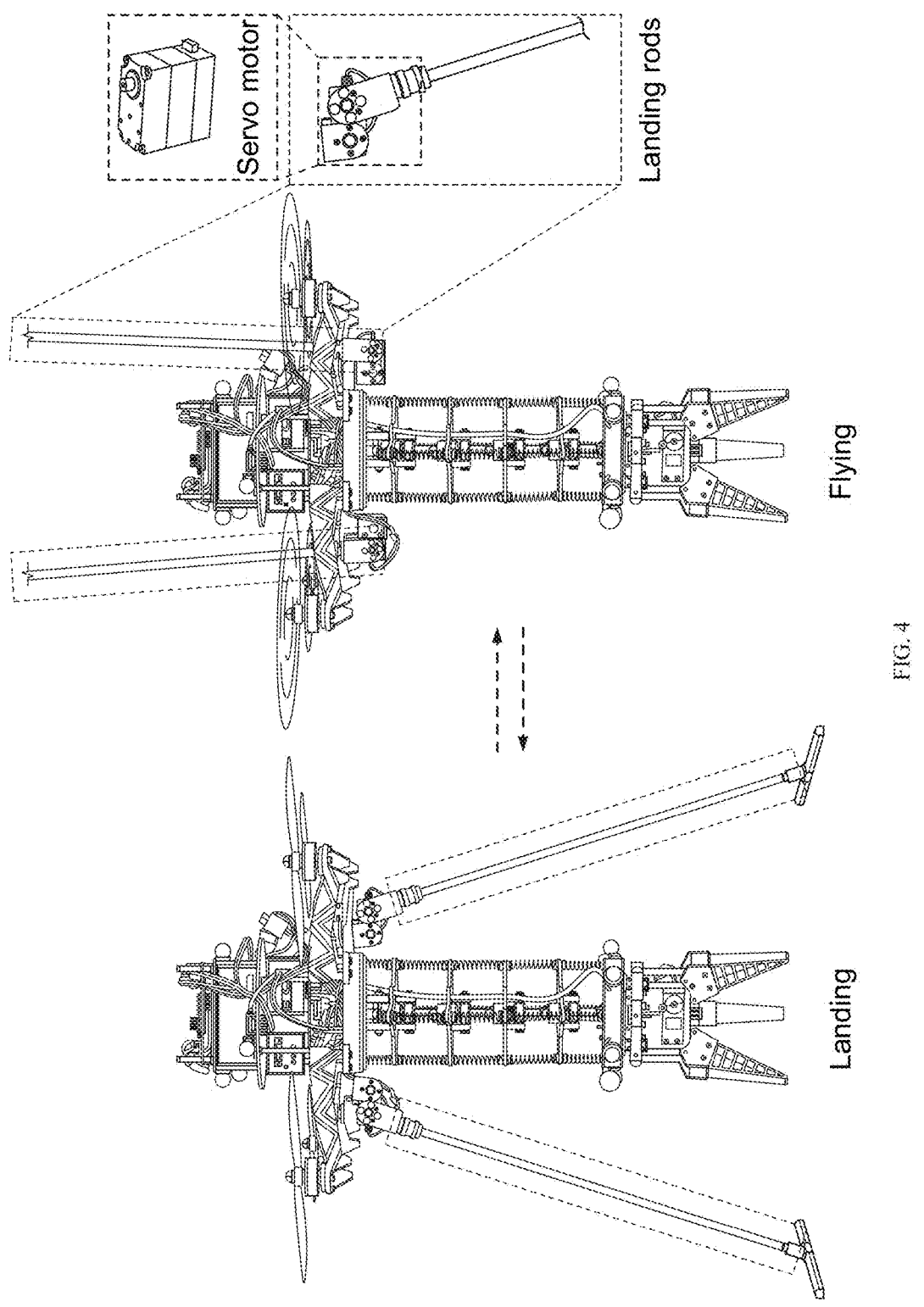
FIG. 4 Illustrates a landing system of an AeCoM in accordance with an embodiment of the subject invention, during the landing status and flying status. The landing system can include two or more landing rods with two or more actuators (e.g., servo motors.)

For most of feasible aerial manipulation systems, one structural part that cannot be overlooked is the auxiliary landing rod. The landing rods are used to support the whole aerial system, before or after conducting aerial flights, to inhibit unnecessary physical damages on the manipulator. However, static landing rods shrink the workspace of the robotic arm. Therefore, this example uses a pair of landing rods that can change their positions by controlling corresponding servo motors, as shown in FIG. 3, panel (b) and panel (f). When the aerial system is on the ground, the landing rods shown in FIG. 4 switch to standing mode to sustain the manipulator. While the system is in aerial flight, the landing rods are rotated (e.g., by 180°) pointing to the above direction, such that the manipulator's motions are not affected by them.

The aerial manipulator compares favorably with conventional aerial manipulators.

1) weight.
2) motion dexterity.

The continuum robotic arm compares favorably with conventional continuum robotic arms.

1) control system design, more compact.
2) stiffness and payload.

Figure 5:
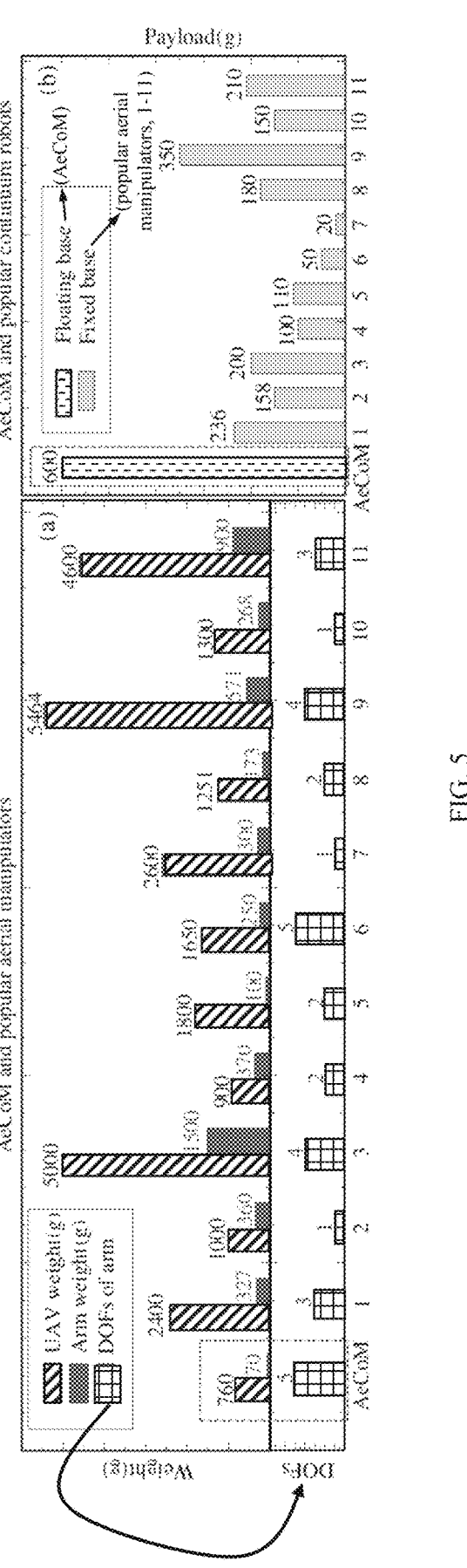
FIG. 5 Presents selected comparison results between an AeCoM in accordance with an embodiment of the subject invention and 11 different related art aerial manipulators in the perspective of mechanism design, including UAV weight, arm weight, and degrees of freedom (DOFs) in the left panel and payload capacity in the right panel.

Selected quantitative comparisons are presented in FIG. 5

Example 3—Modeling

Figure 6:
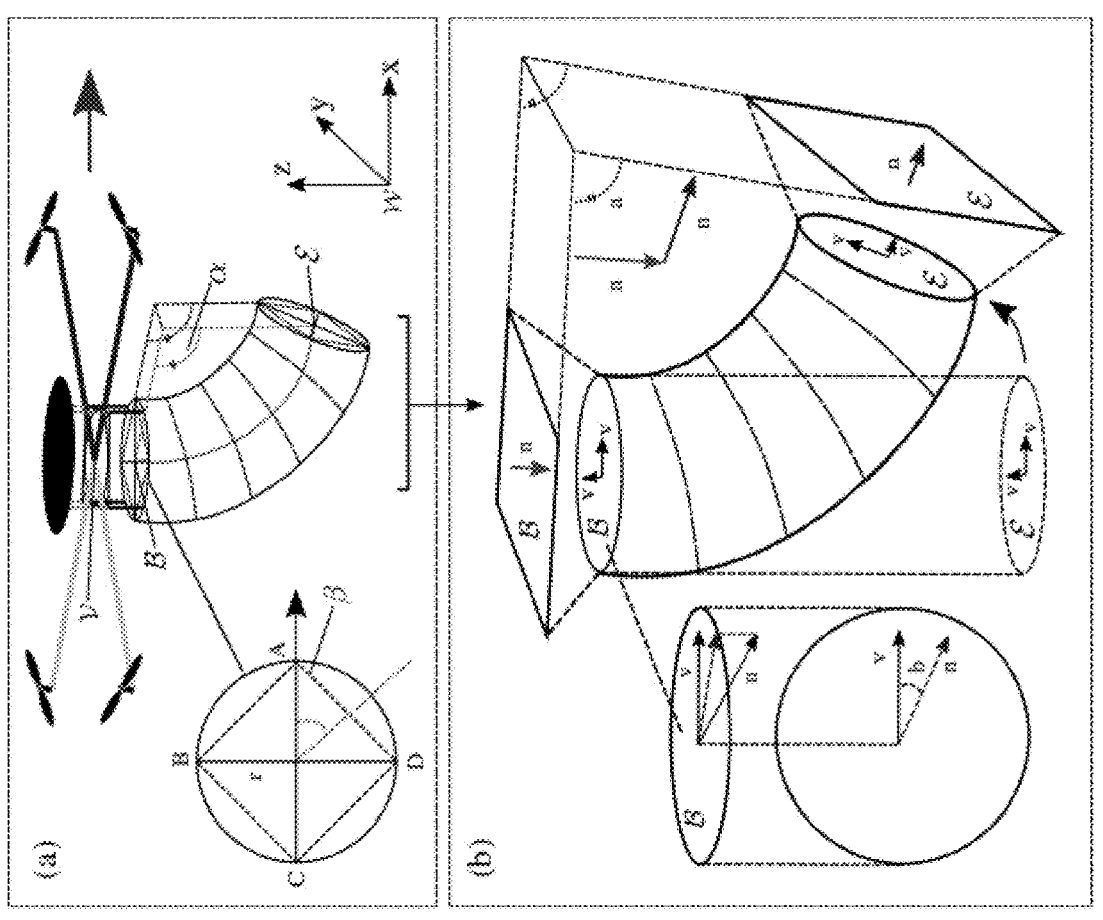
FIG. 6 Depicts a kinematics model diagram of an AeCoM in accordance with an embodiment of the subject invention.

The model can provide a forward and inverse kinematics model, and the dynamic model of the aerial robotic system. To describe the configuration of the system, the model introduces the inertial frame W, the UAV body frame V, the base frame of the manipulator B, and the end-effector frame $\varepsilon$, as shown in FIG. 6. The model defines the generalized coordinates for the system, including UAV position $p=[x, y, z]^T$ and attitude $\eta=[\psi, \theta, \phi]^T$ with respect to the inertial frame. The inertial frame in this example is the earth frame, which is the baseline frame for all the system frames. As for the continuum manipulator part, the model defines $\lambda=[L, \alpha, \beta]^T$ to represent the joint space of piecewise constant curvature (PCC) model in the base frame, and the tendon actuation space $t=[t_1, t_2, t_3, t_4]^T$ denoting the changes of the tendon lengths.

The system's kinematics model is established to describe the locomotion relationships between key frames. An area of concern is how to obtain the accurate pose of the end-effector frame in the inertial frame, to implement effective aerial manipulation tasks. The model builds a kinematic chain as:

$$_W P_{ee} = T_v^{\;w} \cdot T_B^{\;v} \cdot T_E^{\;B} \cdot \varepsilon_{P_{ee}} \qquad (1)$$

where $T_v^{\;w}$ is a homogeneous matrix that could be obtained from external sensors such as VICON or VIO, etc $T_B^{\;v}$ is decided by the mechanical design, as computed in CAD drawings. (VICON is an advanced vision capture system for high-accurate indoor localization. VIO: visual inertial odometry, that is a lightweight localization technology based on fusion of vision and IMU sensors for robotics. CAD: computer-aided design is developed for original drawings mechanism design.) This results in:

$$T_v^W = \begin{bmatrix} R_{ext} & T_{ext} \\ 0 & 1 \end{bmatrix}, \qquad (2)$$

$$T_B^v = \begin{bmatrix} 1 & 0 & 0 & 0 \\ 0 & 1 & 0 & 0 \\ 0 & 0 & 1 & -l_B^v \\ 0 & 0 & 0 & 1 \end{bmatrix}$$

However, it is challenging to compute accurately the transformation matrix $T_\varepsilon^{\;B}$. In the perspective of the continuum robot, embodiments can separate the part to analyze its kinematic model. As depicted in FIG. 6, the continuum robot is regarded as an integrated cylinder with four actuation tendons, that is described in the interval of $$\mu = \frac{\pi}{2}.$$

According to the PCC model, the whole continuum body has constant curvature during bending motions, due to the tendon actuation. Therefore, the geometric relationship between bending motion and tendon lengths, decides the resulting shape of the continuum part. Given an arbitrary continuum shape (e.g., as shown in FIG. 6), the transformation from the actuation space t to the continuum joint space $\lambda$ is built as:

$$t_i = n \cdot L_s - L_i, \, i = 1, 2, 3, 4 \tag{3}$$

$$L_i = L - \alpha \cdot r \cdot \cos[\beta + (i-1)\mu]$$

$$L \approx \frac{L_s \cdot \alpha_s}{2 \sin(\alpha_s / 2)}, \, \alpha_s = \alpha/n$$

where L denotes the approximated circular length, —a represents the bending angle, $\beta$ is the twist angle, and n shows the number of segments of the continuum body. Although the geometric relation gives a direct solution for the joint space, the loading on the end-effector should be fixed or in certain cases equal to zero. The curvature and stiffness of the continuum body are impacted by varying loading, and thus the corresponding tendon lengths are not unique. As a result, the relation (3) cannot guarantee accurate joint configuration under unknown loading. The necessity to address the situation of different loading exists in part due to specific end-effector tools during different aerial manipulation operations. The model introduces an IMU sensor installed on the end-effector plane, as shown in FIG. 3, panel (k) to assist in solving more precise joint configuration. Due to mechanical restraints, there is only bending motion rotating around the pitch and roll axis, without any twisting motion rotating around the yaw direction. The IMU on the end-effector and the IMU on the UAV body, share the same pitch and roll axis. Thus, the model can implement the attitude information of the two IMUs to compute the space relation between the base plane and the end-effector plane. To define two planes numerically, the model denotes the attitude of the EE plane as $\theta_{ee}$ and $\phi_{ee}$, the attitude of the base plane as $\theta_v$ and $\phi_v$. The normals of the two planes are given as:

$$v_{ee,r}=[\cos \theta_{ee}, 0, \sin \theta_{ee}]^T, v_{ee,p}=[0, \cos \phi_{ee}, \sin \phi_{ee}]^T,$$
$$n_{ee}=v_{ee,r} \times v_{ee,p}$$

$$v_{v,r}=[\cos \theta_v, 0, \sin \theta_v]^T, v_{v,p}=[0, \cos \phi_v, \sin \phi_v]^T, n_v=v_{v,}$$
$$_{r} \times v_{v,p} \tag{4}$$

where $v_{ee,r}$ and $v_{ee,p}$ are a pair of orthogonal unit vectors in the EE plane, while $v_{v,r}$ and $v_{v,p}$ are the other pair of orthogonal unit vectors in the base plane, respectively. Then, the included angle $\in_n$ of the two planes, that is the bending angle $\alpha$ is given as:

$$\alpha = \epsilon_n = <n_{ee}, n_v>, \qquad \epsilon_n \le \frac{\pi}{2} \tag{5}$$

$$\beta = <{}^v n_{ee}, {}^v v_+ >, \qquad {}^v v_+ = [1, 0, 0]^T$$

where ${}^v n_{ee}$ denotes the projection vector of the $n_{ee}$ in the base plane, and ${}^v v+$ is defined as the benchmark direction along the pitch axis in the base plane. Then, the twisting angle $\beta$ is derived by the projection vector and the benchmark vector.

With the configuration of the continuum part, the model can derive the local position of the EE with respect to the base origin, as:

$$^{\varepsilon}P_{ee} = \begin{bmatrix} x_{ee} \\ y_{ee} \\ z_{ee} \end{bmatrix} = \frac{L}{\alpha} \begin{bmatrix} (1 - \cos \alpha)\cos \beta \\ (1 - \cos \alpha)\cos \beta \\ \sin \alpha \end{bmatrix} \tag{6}$$

Inversely, to compute desired continuum configuration with targeted position information, the model uses:

$$\begin{bmatrix} \alpha \\ \beta \end{bmatrix} = \begin{bmatrix} 2 \arccos\left(\frac{|z_{ee}|}{\|{}^{\varepsilon}P_{ee}\|}\right) \\ \arctan\left(\frac{y_{ee}}{x_{ee}}\right) \end{bmatrix} \tag{7}$$

With the compensation of the IMU on the EE, the model can obtain more precise continuum configuration for real-time kinematic solving, as can be validated under different loading in Example 5.

The dynamics model of the aerial continuum system is derived using the Lagrange method. To achieve this, the model can define the following generalized Lagrangian coordinates:

$$\zeta = \begin{bmatrix} \underbrace{x_v, y_v, z_v,}_{WP_v} & \underbrace{\psi, \theta, \phi,}_{\eta} & \underbrace{L, \alpha, \beta}_{\lambda} \end{bmatrix}^T \tag{8}$$

The compact equation of motion (EOM) of the aerial manipulation system can be given as:

$$M(\zeta)\ddot{\zeta}+(C(\zeta,\dot{\zeta})+S_c)\dot{\zeta}+G(\zeta)=\tau+\tau_{ext} \tag{9}$$

where $M(\zeta)$ is symmetric positive definite inertia matrix, $C(\zeta, \dot{\zeta})$ is the centrifugal and Coriolis effect, Sc is the friction coefficient, $G(\zeta)$ denotes the gravity term, $\tau$ is the generalized forces actuating on the aerial system and $\tau_{ext}$ denotes external forces and moments. The generated force or torque $\tau$ actuating on the aerial vehicle and the continuum manipulator can be represented as:

$$\tau = \begin{bmatrix} F_v(\eta) \\ \tau_v \\ \tau_m \end{bmatrix} \tag{10}$$

where $F_v(\eta)$ and $\tau_v$ denote the aerodynamic force and torque acting on the aerial robot respectively, and $\tau_m$ is the torque actuated on the manipulator.

Example 4—Control Method

Turning now to the control framework of the provided system, to address the control problem of the system, the most important application is to realize accurate positioning control for the aerial end-effector. To achieve this, the model can employ the centralized control strategy and separate the whole system into two control subsystems: the aerial platform control and the continuum manipulator control. The aerial platform control and the manipulator control together make up the integrated system and are derived from the dynamics model. For the UAV control, an integrated cascade P-PID controller can be used to maintain the stability of UAV platform, while the controller of the continuum part is designed to control its attitude and maintain tendon tension for slacking avoidance, during any aerial manipulation tasks.

Figure 7:
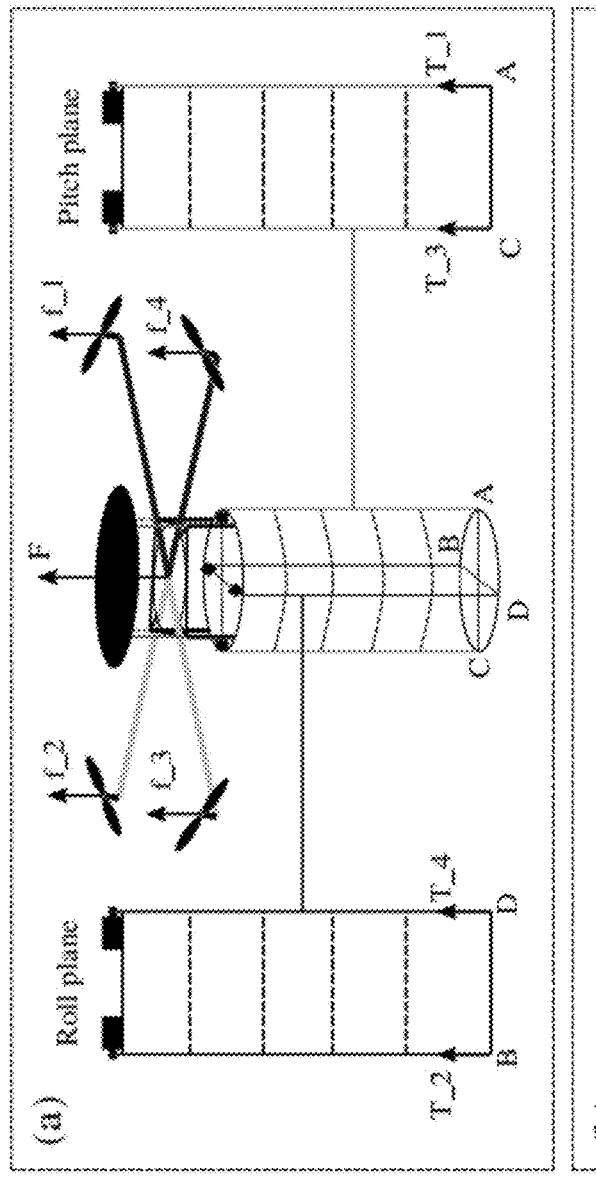
FIG. 7 Depicts a controller diagram of an AeCoM in accordance with an embodiment of the subject invention.
Figure 7:
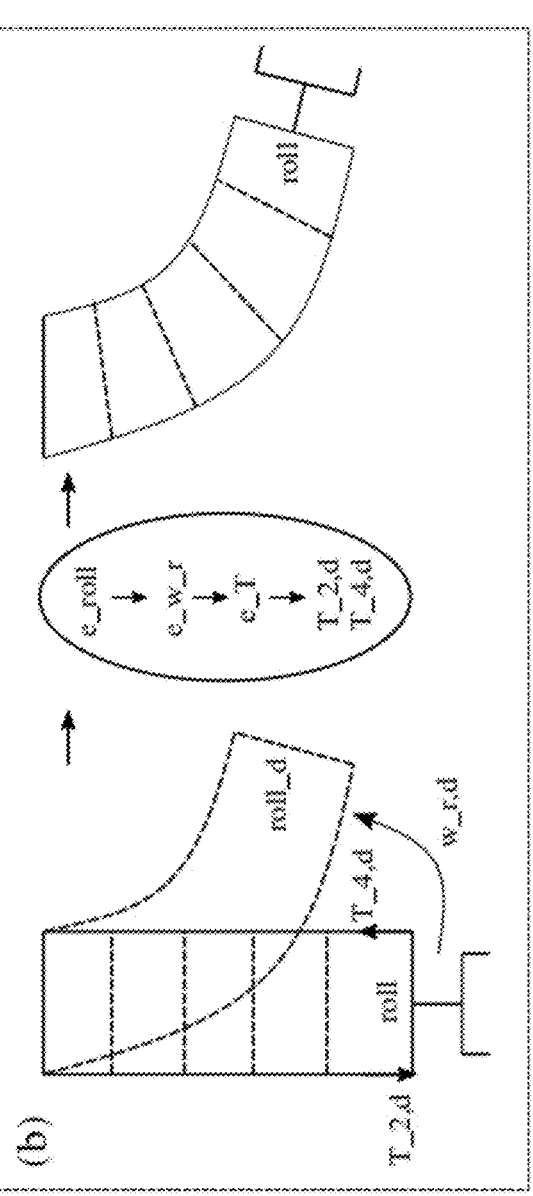

The UAV controller in this example encompasses two loops: position and velocity control in the outer loop, and attitude control in the inner loop. The system controller diagram is shown in FIG. 7.

The model can provide a feedback attitude-rate-tension cascade controller for the continuum manipulator. Considering the mechanical structure of the manipulator, two diagonal pairs of tendons are aligned with the pitch and roll axis correspondingly. Thus, the push-pull movement of one pair of tendons decides the associated attitude changes. Meanwhile, the attitude of the EE plane is deeply binding with the manipulator's configuration space, as presented in Example 3. Given a set pose of the end-effector, the position part could be transformed to configuration parameters (the bending angle and twisting angle), that are transformed to attitude. The control of EE attitude equals to the control of EE's pose.

Based on discussion above, the attitude control part can be written as:

$$e_q = q_{sp} - q, q = [\theta_{ee}, \phi_{ee}]^T \ \omega_{sp} = k_{q,p} \cdot e_q \tag{11}$$

where the $\theta_{ee}$ and $\phi_{ee}$ are obtained from the EE's IMU, $k_{q,p}$ is the positive gain. Also, the IMU could provide angular rates $\omega$ around the pitch and roll axis. Then, the angular rate control layer is built as:

$$e_\omega = \omega_{sp} - \omega, \omega = [w_{\theta,ee}, \omega_{\phi,ee}]T \ m_{sp} = k_{\omega,p} \cdot e_\omega + k_{\omega,i} \cdot \int be_\omega dt + k_{\omega,d} \cdot e_\omega \tag{12}$$

where the model can introduce the bending moment $m = [m_\theta, m_\phi]^T$ for the continuum manipulator, as shown in FIG. 7. According to the torque sensors embedded in the tendon-actuated motors, the sensors could return the real time tension information of the related tendons. Here the model can define the tension vector $f_t = [f_1, f_2, f_3, f_4]^T$ to collect the tension value from four tendons. The relationship between the bending moment $m$ and the tension vector $f_t$ is established as:

$$m = \begin{bmatrix} m_\theta \\ m_\phi \end{bmatrix} = \frac{m_{sp}}{\|m_{sp}\|} \begin{bmatrix} f_1 - f_3 \\ f_2 - f_4 \end{bmatrix} \tag{13}$$

Then, the bending moment control layer is given as:

$$e_m = m_{sp} - m \ v_{sp} = k_{m,p} \cdot e_m + k_{m,i} \cdot \int be_m dt + k_{m,d} \cdot e_m \tag{14}$$

where the desired motor velocity v is sent to the inner PID controller of the motors, and motors are actuated to manipulate tendon lengths. The manipulator controller has three consecutive control layers, designed to take attitude, rate, and tension into account. The innermost layer introduces tension constraints for controlling each motor, to restrict lowest tension for each tendon, which leads to avoidance of tension loss and tendon slacking. The validation and comparison results will be demonstrated in Example 5.

Example 5—Experiments

This section demonstrates detailed comparison with previous aerial manipulators, control performance evaluation including control response and tendon slacking avoidance, validation of the kinematics model, and aerial grasping evaluation.

Figure 8:
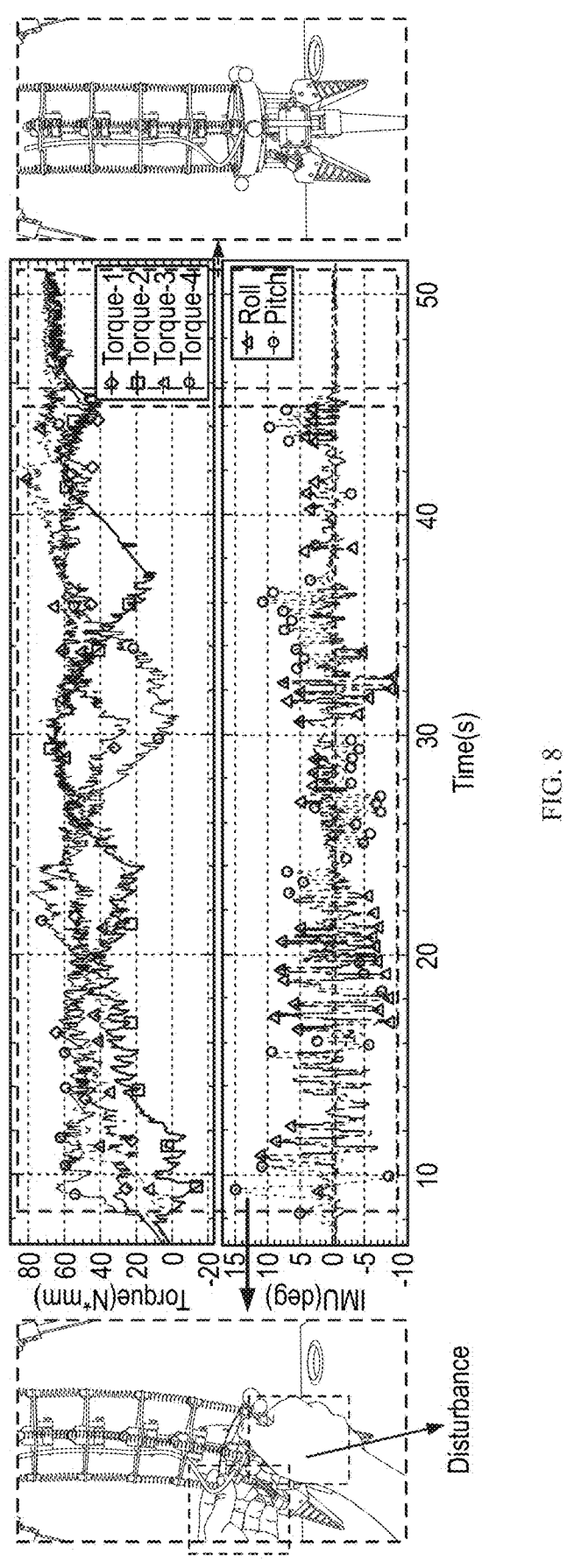
FIG. 8 Illustrates certain aspects of a digital process of system initialization, in accordance with an embodiment of the subject invention.

For tendon-driven continuum robots, it is necessary to initialize the body displacement and tendon tension. Normally, the tendons are tightened manually or by mechanism for pre-tensioning, before any motions. However, these external interventions are tedious and not user-friendly, especially in repeatable applications. The model can utilize the tension sensors and IMU to implement an autonomous self-initialization method, which could ensure that every time the system is powered, the continuum robotic arm is adjusted to the perfect attitude (the EE plane parallel to horizontal plane) quickly and each tendon is tensioned equally. Here the model can design an initialization experiment to validate the robustness and performance of anti-interference of the initialization method. First the model can put the whole system in stationary, and the continuum manipulator is under an arbitrary circumstance, where the EE's attitude and tendons' tension are unknown. The purpose is to verify that, the manipulator could adjust the tendons' tension autonomously and tune the EE's attitude to nearly zero, under any situations without manual or other assistance. The experimental result is demonstrated in FIG. 8.

It can be seen that the continuum manipulator could control its EE's attitude horizontally and tendons' tension in a short time (5 s). Then, there is aggressive interference applied on the body, and the manipulator could still respond to adjust its motion status. Finally, the initialization goal is achieved even facing an unreasonable disturbance. The model can test the initialization process over 20 times and every test could satisfy the predefined standard. The experiment proves that it is highly convenient to make the whole system self-initialization, compared with the previous pretensioned approaches. With this method, the provided system becomes more efficient to deal with various application tasks.

To cope with future complex aerial application tasks, the provided system is required to have delicate motion response. Thus, fast bending motion for the manipulator is needed, even though it brings high possibility of tendon slacking. As discussed in Example 4, due to attitude and tension feedback, experiments of aerial fast motion are designed to validate the capability of slacking avoidance.

Figure 9:
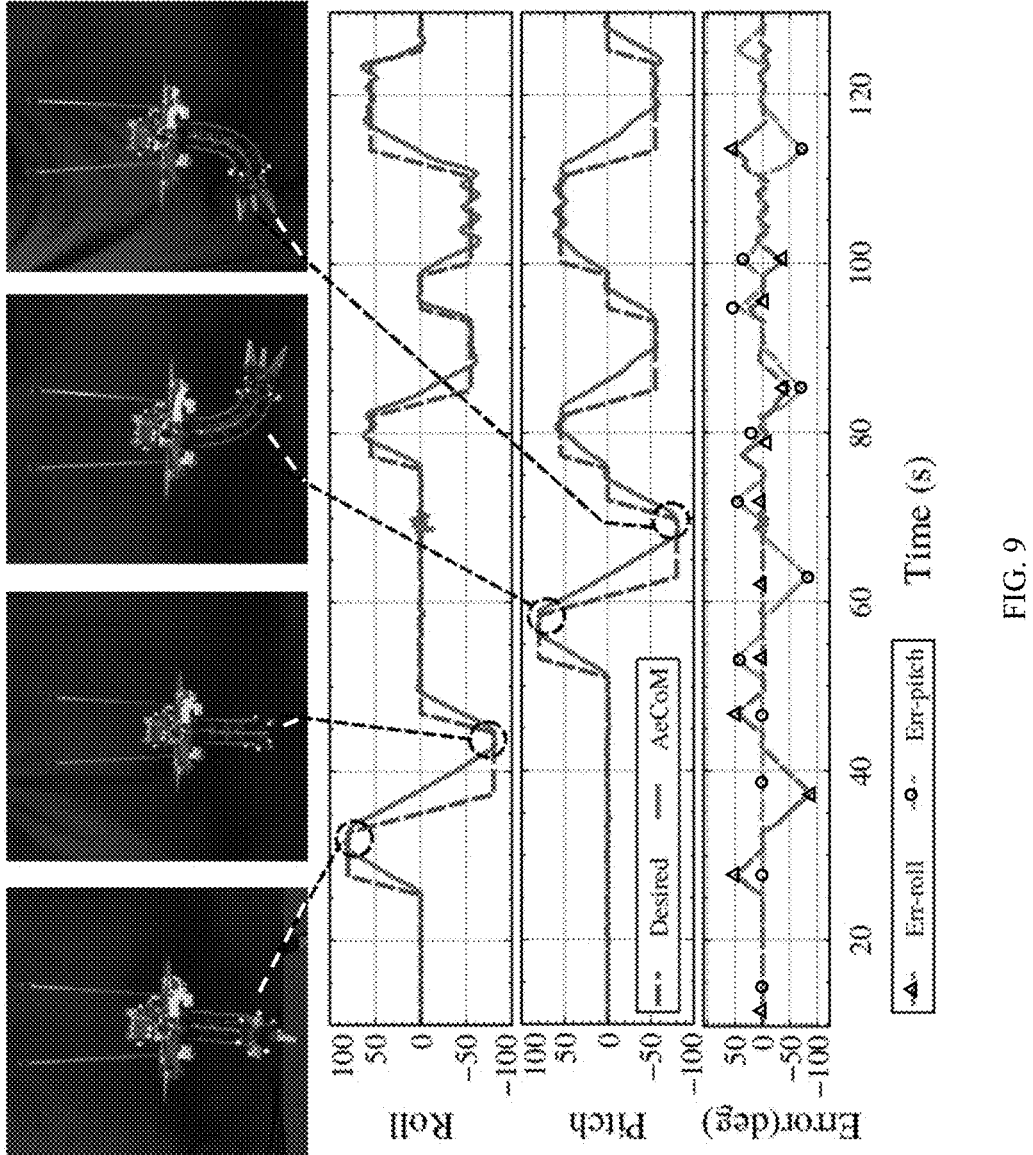
FIG. 9 Demonstrates selected consecutive bending motions of a manipulator part in accordance with an embodiment of the subject invention during flights. The performance of attitude control for the EE is presented.

The manipulator is controlled to conduct consecutive swing motions within a large margin, following the pitch and roll axis respectively. To prove that there is no slacking during the aggressive motions, the difference between the current attitude and desired attitude should be tightly controlled. On the other hand, if the current attitude cannot follow the desired attitude, it is evident that the tendons cannot provide enough actuation to manipulate the continuum body. Under this situation, tendon slacking is identified. The result of a swing motion around a single axis is shown in FIG. 9.

To evaluate controller performance and prove the feasibility and performance of the provided manipulator controller, the inventors tested continuous swing motion using the designed controller, attitude-feedback controller and the conventional continuum controller. The experimental motion is defined as single axis swing motion. When the aerial manipulator is hovering, the robotic arm conducts swing motion along the roll axis, according to a list of desired attitudes. The attitude control performance result is shown as FIG. 10. The experiment compares the three controllers under the predefined motion. According to the comparison between the designed controller and the attitude-feedback controller, they have the same performance on attitude tracking at the first several periods, such as similar response rate and fitting curves. However, without tension feedback, the attitude-feedback controller lost the capability of tracking due to tendon loosing, with notable deterioration in Roll performance after about 80 seconds, and in the pitch axis after about 60 seconds. The designed controller in accordance with the subject invention demonstrated the ability to maintain stable and robust tracking performance.

Figure 10:
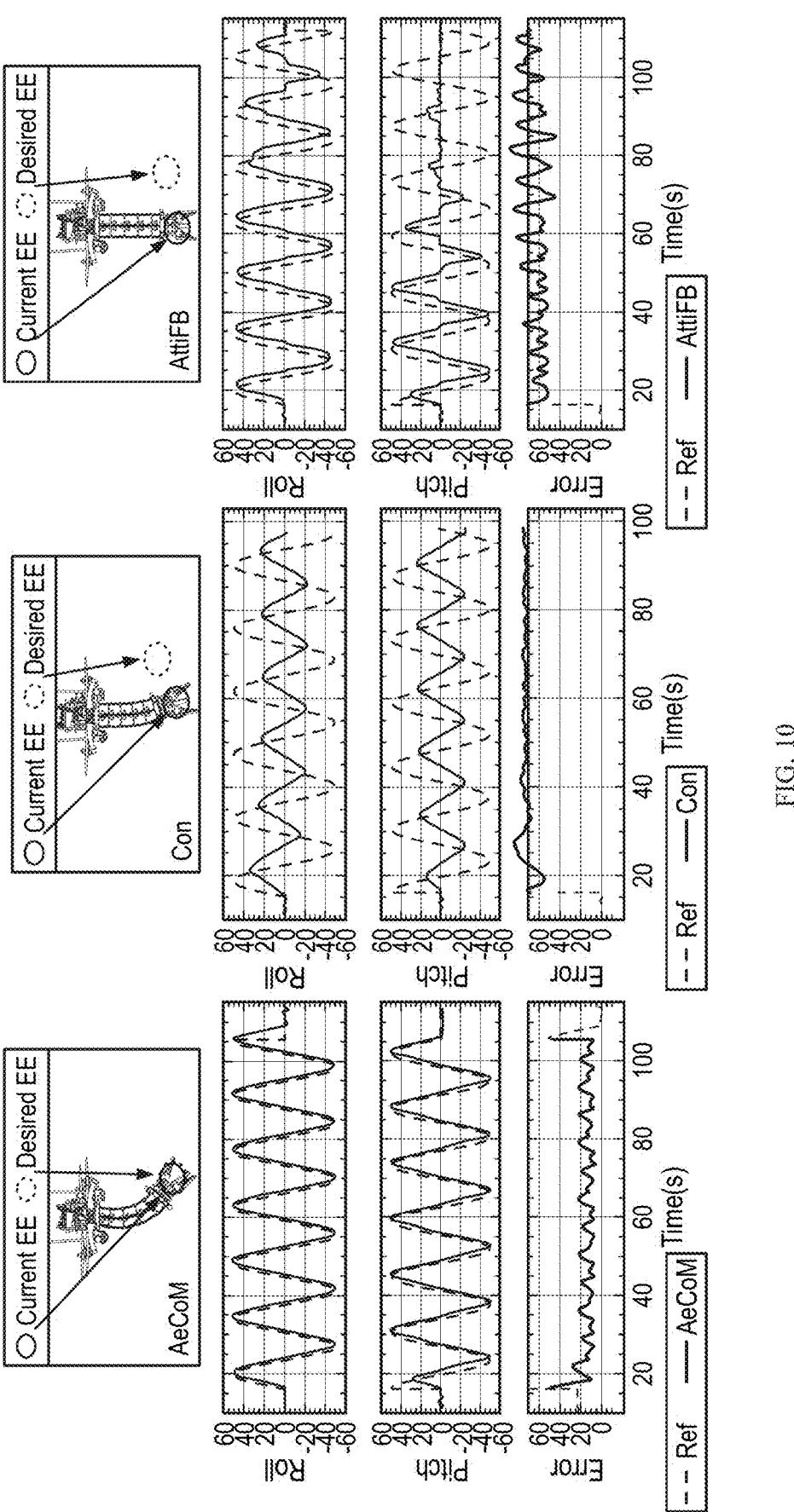
FIG. 10 Illustrates selected comparison results for a designed controller (AeCoM) in accordance with an embodiment of the subject invention with other two controllers (Con, and AttiFB.)

Another comparison between the designed controller and the conventional continuum controller in FIG. 10 shows that, the conventional continuum controller cannot handle fast tracking response as well as the provided controller in accordance with an embodiment of the subject invention.

Kinematics Model Validation

Figure 11:
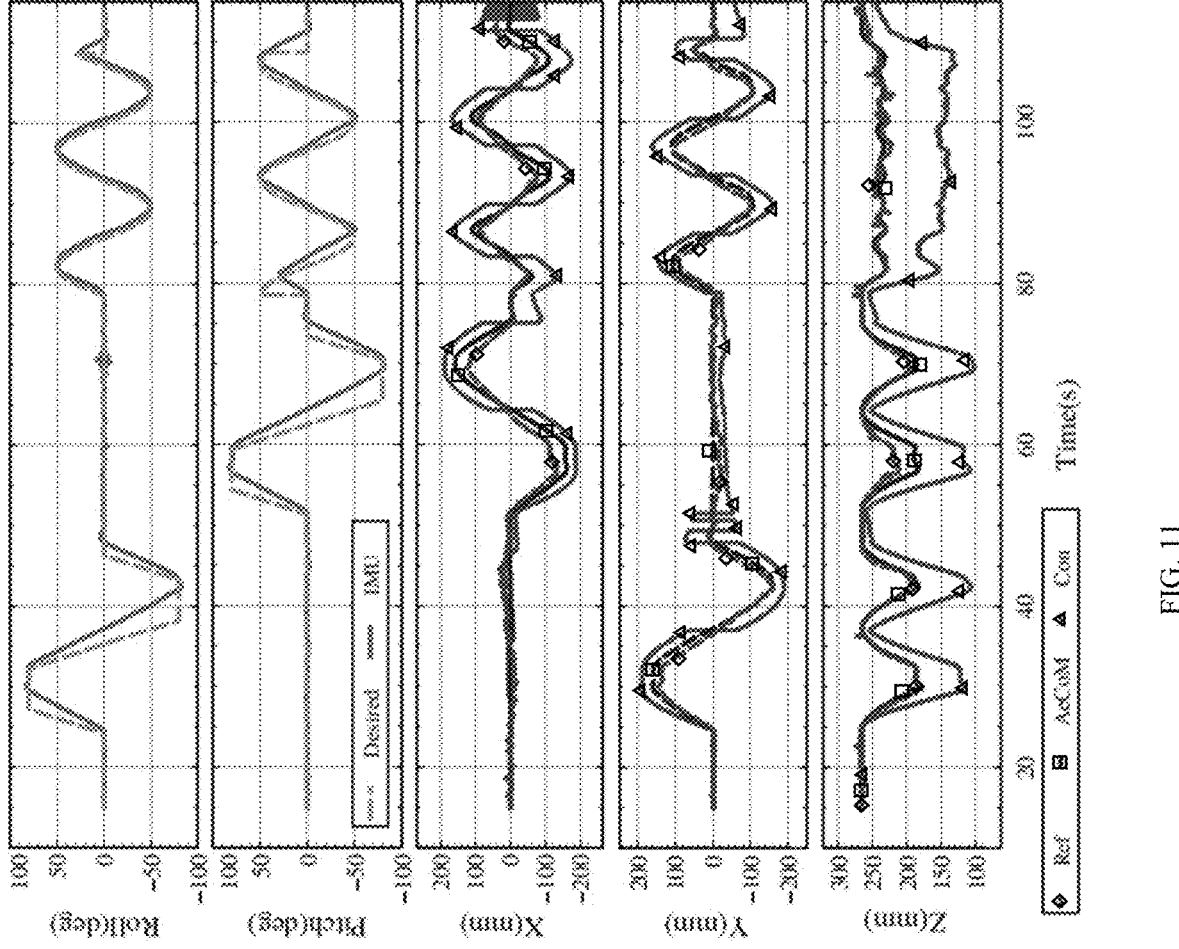
FIG. 11 Presents the performance relative to a desired reference state (Ref) of a designed kinematics model in accordance with an embodiment of the subject invention (AeCoM), and comparison with a conventional kinematics model (Con.)

To comprehensively evaluate the model, the range of the bending motion should be as large as possible. Thus, embodiments can advantageously utilize single-axis bending motion and dual-axis combination motion which makes the end-effector draw circles. During the whole bending motion, the proposed kinematics model and conventional model can produce a translational solution in X-Y-Z coordinates. Then, embodiments can compare the results of the two models with the vicon groundtruth under the loading of 300 g, as shown in FIG. 11.

Figure 12:
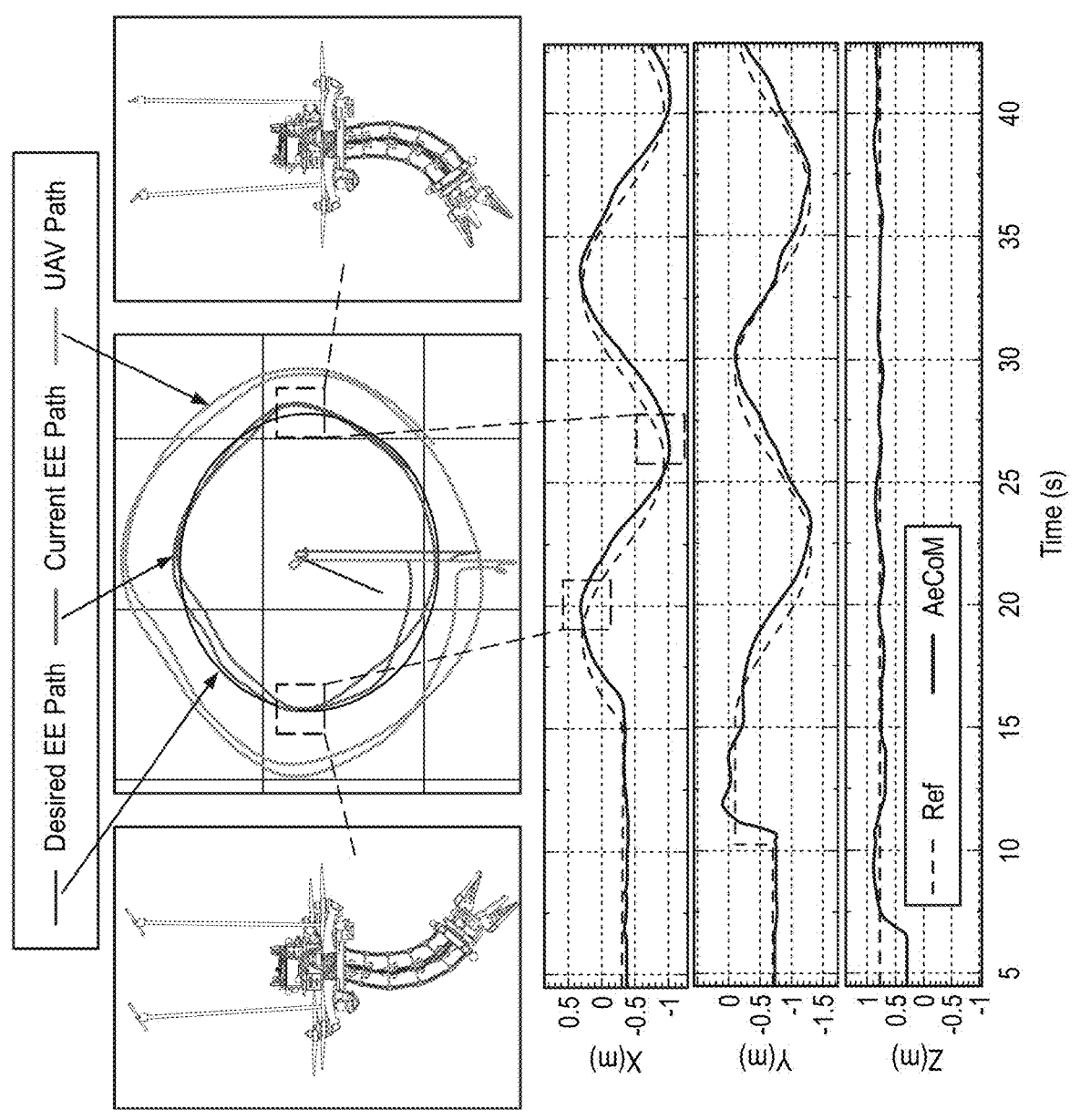
FIG. 12 Demonstrates the performance of an EE tracking motion in accordance with an embodiment of the subject invention, with evaluation of the EE pose accuracy.

With the kinematics model, embodiments can compute the real-time pose of the end-effector in the world coordinate with known global UAV pose. Embodiments can design the EE tracking motion to validate the global EE pose, as shown in FIG. 12.

Aerial Grasping

Figure 13:
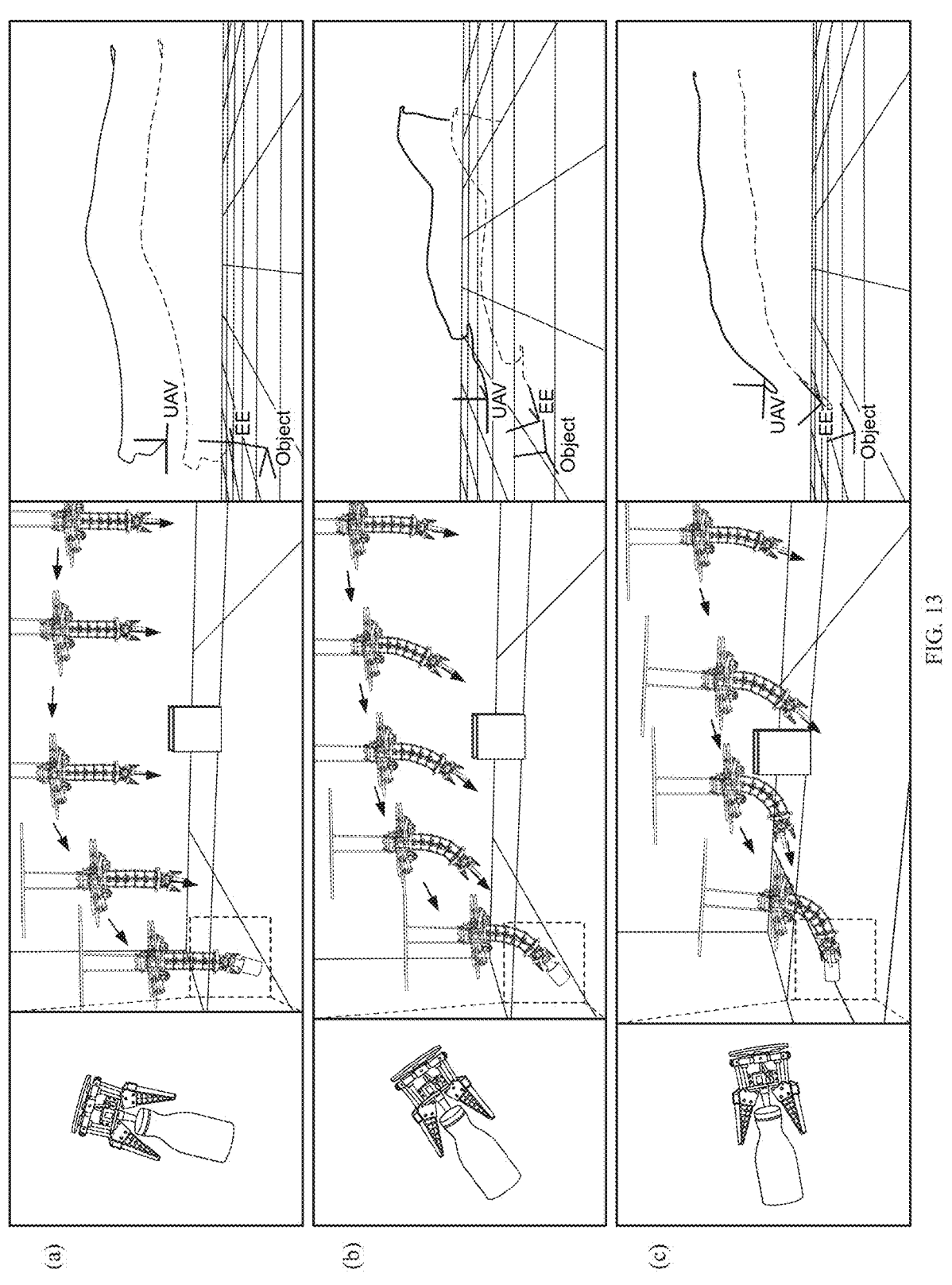
FIG. 13 Presents aerial grasping experiments for different object poses in accordance with C an embodiment of the subject invention. The object (e.g., a bottle) is put in (a) 15 degree, (b) 50 degree, and (c) 80 degree orientation, respectively from the vertical.
Figure 14:
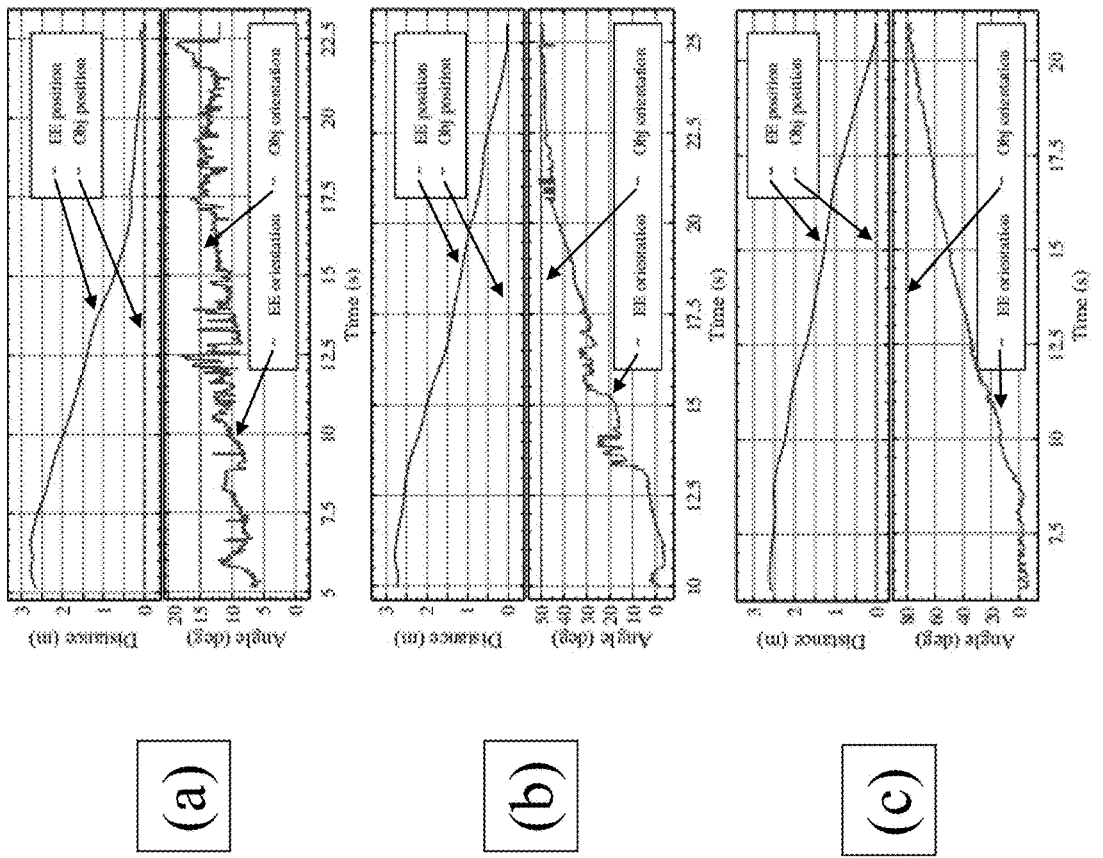
FIG. 14 Presents quantitative results during aerial grasping experiments for different object poses in accordance with an embodiment of the subject invention. The object (e.g., a bottle) is put in (a) 15 degree, (b) 50 degree, and (c) 80 degree orientation, respectively, from the vertical.

To present the actual interaction functionality of the proposed aerial system, embodiments can design aerial grasping experiments for a static object with different standing poses. Embodiments can employ a bottle as the target object, in part because it is easy to change its orientation. To comprehensively validate the grasping performance, the orientation of the object can be defined as the included angle between the object body and the horizontal plane. A group of variable angles including, for example, 15°, 50°, and 80° can be set. The pose of the object can be given by the vicon system. During the grasping process for each pose of the object, the aerial system gradually moves from one remote pose to the position of the object. Meanwhile, the pose of the robotic arm changes with the translational motion to correspond with the target's orientation. After the gripper catches the object, the system can fly to another position where a box is located, and unload the object into the box. FIG. 13 presents the aerial grasping process with several actual poses in the grasping paths.

Example 7—Large Scale Prototype

To achieve larger workspace, a prototype was designed and constructed with five identical segments assembled consecutively to extend the bending range, forming one single continuum section, as shown in FIG. 3, panel (c).

Figure 17:
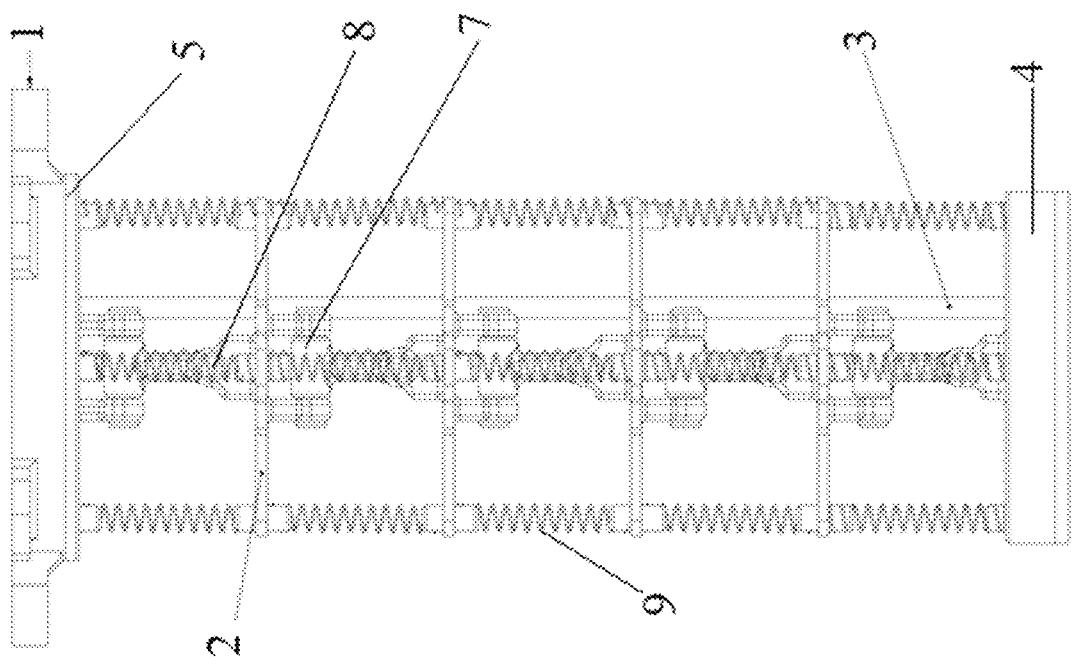
FIG. 17 Illustrates a mechanical design overview of a continuum robotic arm according to an embodiment of the subject invention.
Figure 22:
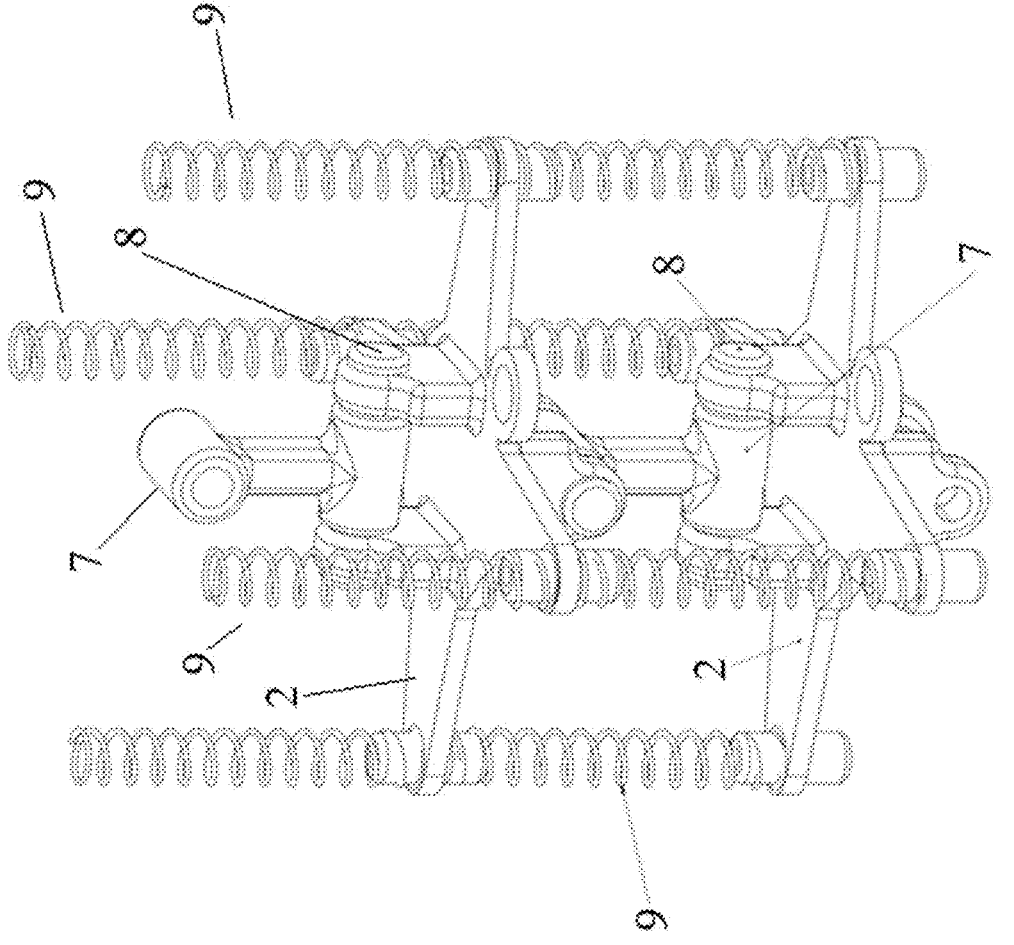
FIG. 22 Illustrates a detailed consecutive connection of two segments of a continuum robotic arm according to an embodiment of the subject invention.

The mechanical design overview for this embodiment of the continuum robotic arm is shown in FIG. 17. Each of the five segments is defined as shown in FIG. 22 by two cross disks (2) that are connected by a mechanical gimbal (7) and pin shafts (8), and four springs (9) evenly distributed in each disk as support structures. The top segment is anchored to motor installation base (1) and base disk (5), while the bottom segment is anchored to end disk-(4).

Figure 18:
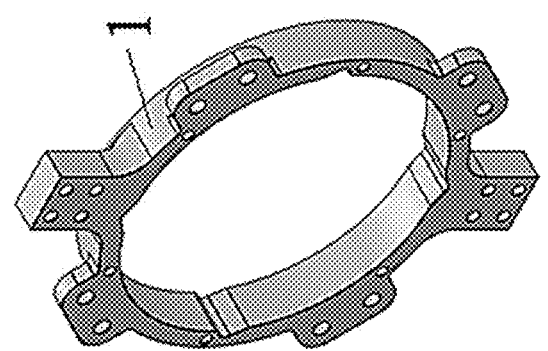
FIG. 18 Illustrates the first component assembled for each segment of a continuum robotic arm, a motor installation base according to an embodiment of the subject invention.
Figure 18:
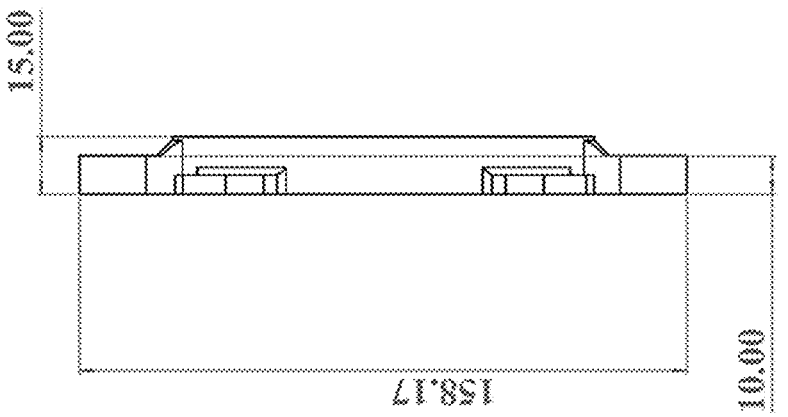
Figure 18:
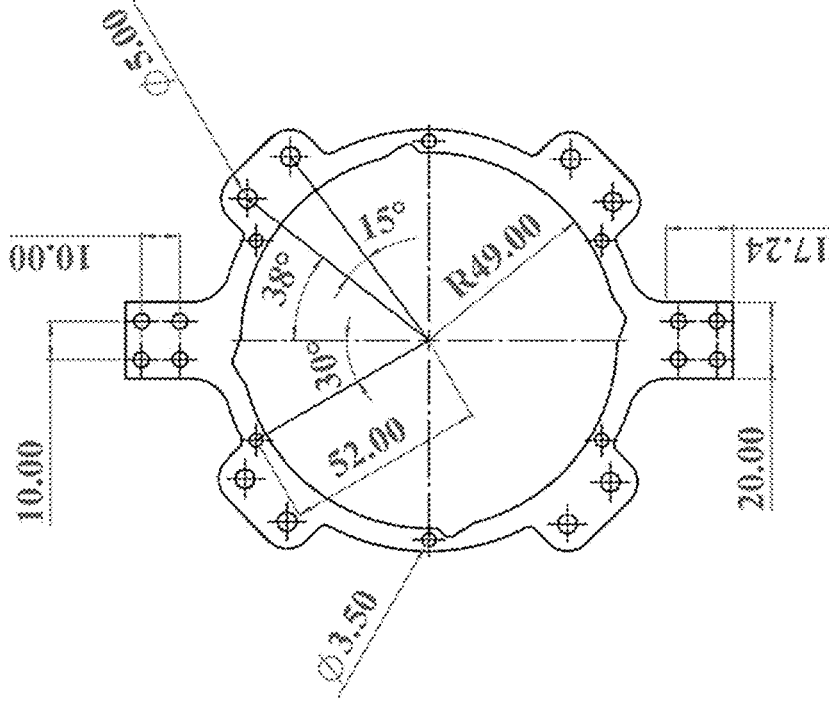
Figure 19:
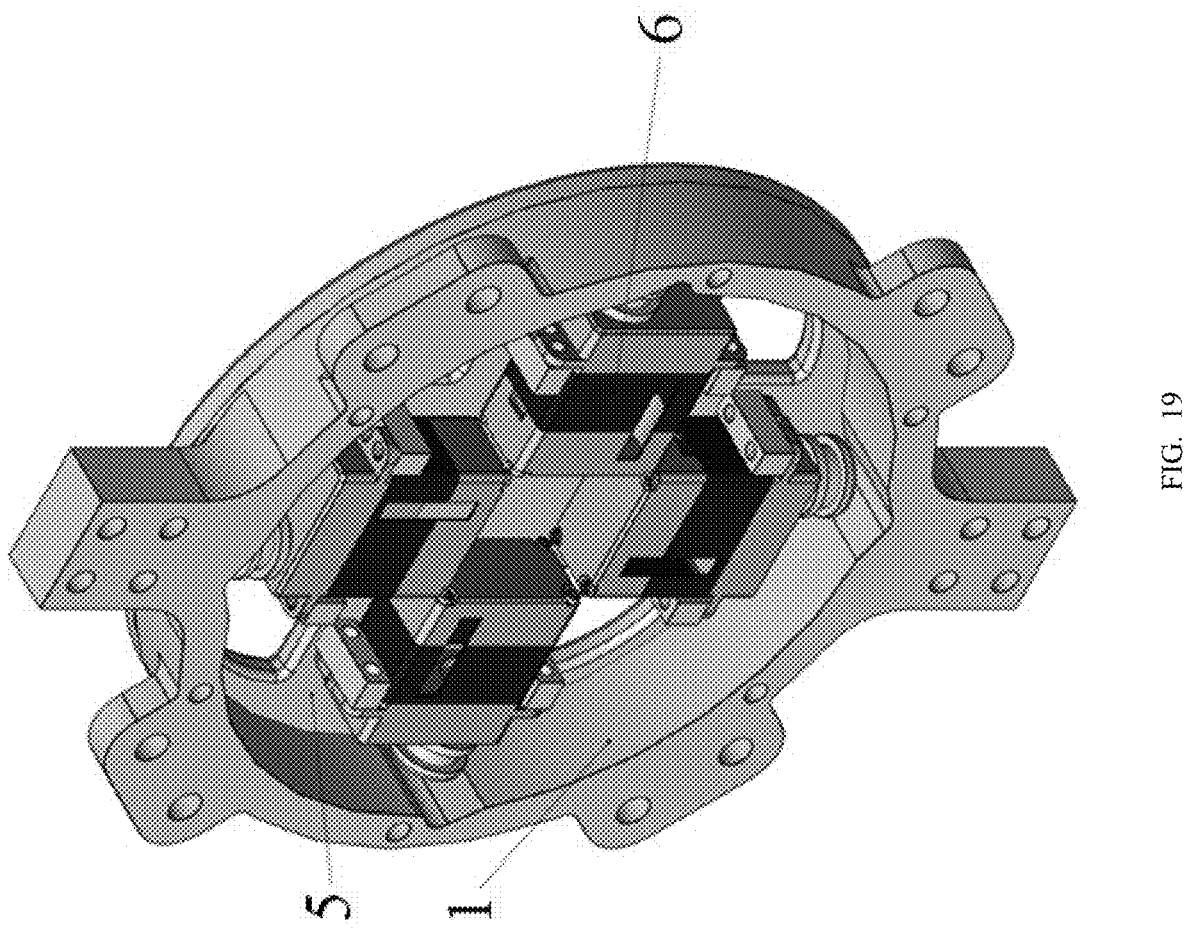
FIG. 19 Illustrates a configuration of a motor installation base with four actuation motors installed for a continuum robotic arm according to an embodiment of the subject invention.

For this embodiment, the first component to assemble below the control box for a first motion segment is a motor installation base (1) as shown in FIG. 18. The motor installation base (1) can have a maximum outer width of 158 mm across the largest mounting flanges, a maximum thickness of 15 mm, a flange thickness of 10 mm, an inner opening radius of 49 mm, and mounting hole dimensions and offsets as shown in FIG. 18.With four actuation motors (6) installed to a base disk (5) attached to the motor installation base (1), the layout for this embodiment is shown in FIG. 19.

Figure 20:
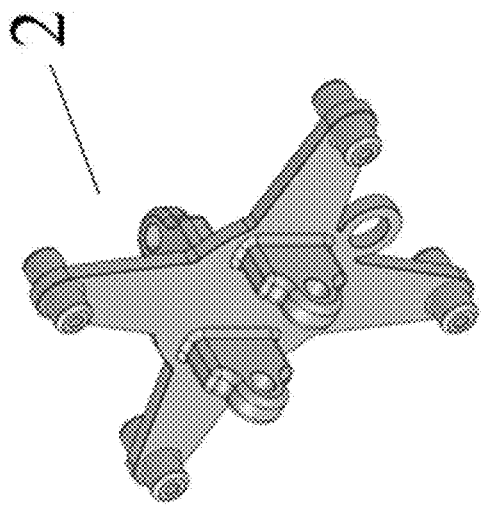
FIG. 20 Illustrates a cross disk for a continuum robotic arm according to an embodiment of the subject invention.
Figure 20:
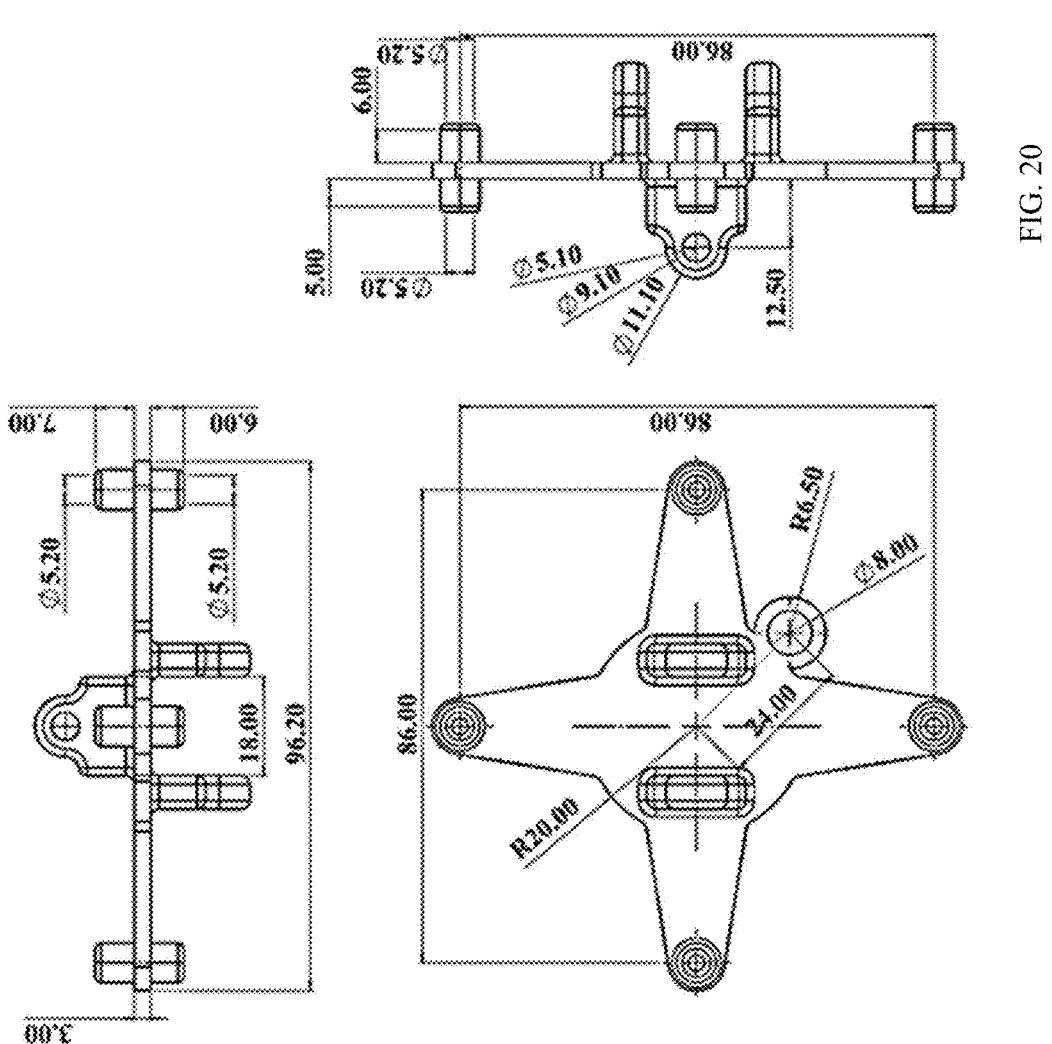
Figure 21:
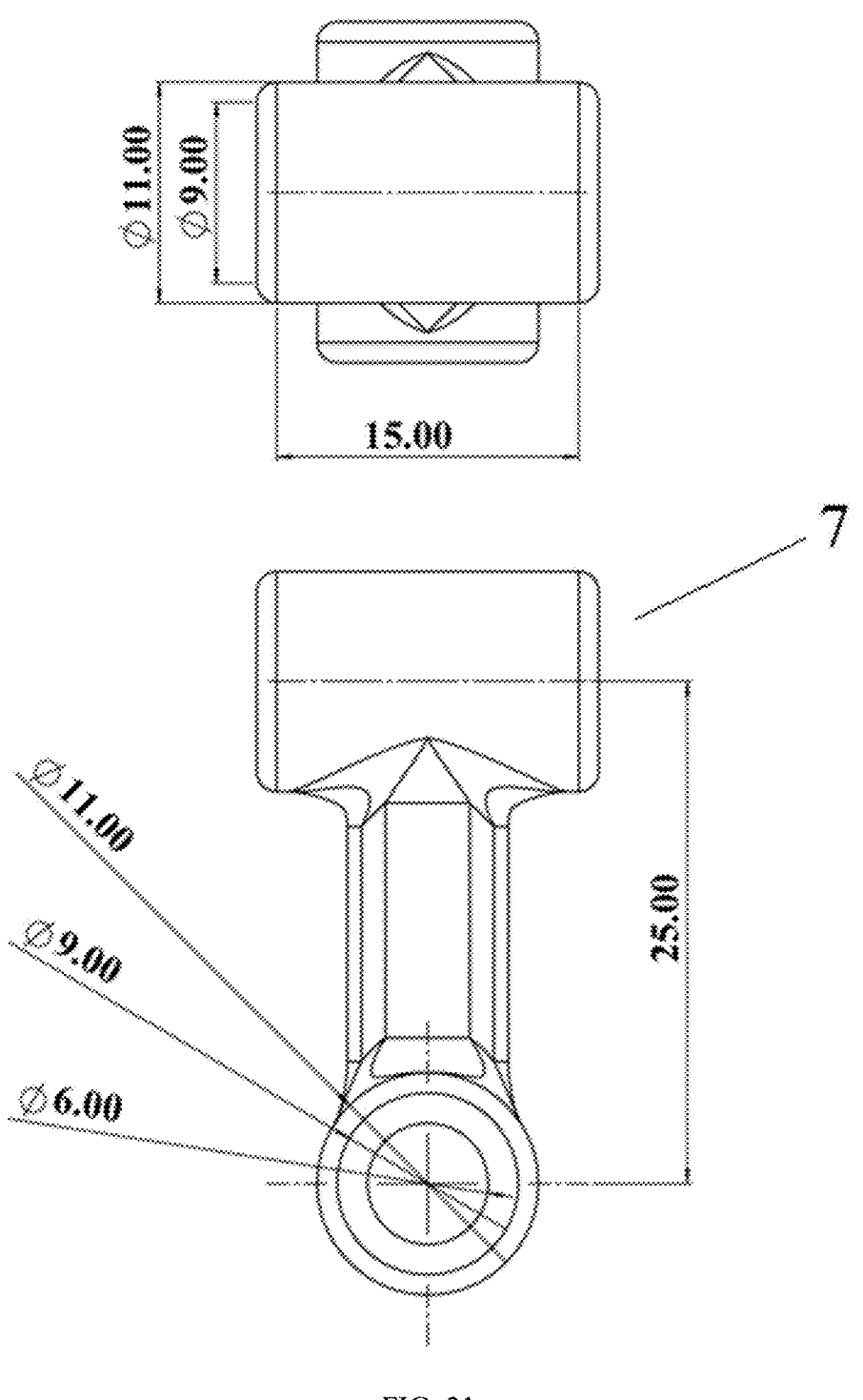
FIG. 21 Illustrates a gimbal designed to connect every two consecutive cross disks in a continuum robotic arm according to an embodiment of the subject invention.

The central cross disk (2) design for this embodiment is as shown in FIG. 20 with a body thickness of 3 mm, a spring mounting boss height of 7 mm on a top side and 6 mm on a bottom side, a spring mounting boss outer diameter of 5.2 mm, a center to center distance of 86 mm between opposite spring mounting bosses, a center height of a top gimbal mount 12.5 mm above the body, and a bottom gimbal mount spacing width of 18 mm below the body. The cross disk (2) also provides a control wire passage guide hole having an 8 mm diameter and a center distance offset of 24 mm from the centroid of the cross disk (2). To connect every two consecutive cross disks (2) in this embodiment, the gimbal (7) is designed as shown in FIG. 21 with a perpendicular distance of 25 mm between an upper gimble axis through an upper gimble boss and a lower gimble axis (transverse to the upper gimble axis) through a lower gimble boss. The upper and lower gimble bosses each, respectively can have a 6 mm inner diameter, a 9 mm outer bushing diameter, an 11 mm outer boss diameter, and a 15 mm outer boss width. The detailed consecutive connection of two segments in this embodiment is shown in FIG. 22 with two cross disks (2) connected by a gimbal (7) and pin shafts (8) and supported by springs (9).

Example 6—Summary

Embodiments provide a novel aerial continuum manipulator with original mechanical design and complete modeling and control framework that is able to address the issue of slacking for a tendon-driven continuum robotic arm and establish a new kinematics model for the provided aerial system. To validate the system performance, the inventors designed several experiments: continuous aerial bending motion, aerial grasping tasks, and other comparison experiments. The system shows good accuracy in kinematics modeling and actual applications.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] F. Ruggiero, V. Lippiello, and A. Ollero, "Aerial manipulation: A literature review," IEEE Robotics and Automation Letters, vol. 3, no. 3, pp. 1957-1964, 2018.
[2] A. E. Jimenez-Cano, J. Martin, G. Heredia, A. Ollero, and R. Cano, "Control of an aerial robot with multi-link arm for assembly tasks," in 2013 IEEE International Conference on Robotics and Automation. IEEE, 2013, pp. 4916-4921.

[3] C. Korpela, M. Orsag, and P. Oh, "Towards valve turning using a dual-arm aerial manipulator," in 2014 IEEE/RSJ International Conference on Intelligent Robots and Systems. IEEE, 2014, pp. 3411-3416.

[4] S. Kim, H. Seo, and H. J. Kim, "Operating an unknown drawer using an aerial manipulator," in 2015 IEEE International Conference on Robotics and Automation (ICRA). IEEE, 2015, pp. 5503-5508.

[5] H. Tsukagoshi, M. Watanabe, T. Hamada, D. Ashlih, and R. Iizuka, "Aerial manipulator with perching and door-opening capability," in 2015 IEEE International Conference on Robotics and Automation (ICRA). IEEE, 2015, pp. 4663-4668.

[6] D. Lee, H. Seo, D. Kim, and H. J. Kim, "Aerial manipulation using model predictive control for opening a hinged door," in 2020 IEEE International Conference on Robotics and Automation (ICRA). IEEE, 2020, pp. 1237-1242.

[7] A. Suarez, P. R. Soria, G. Heredia, B. C. Arrue, and A. Ollero, "Anthropomorphic, compliant and lightweight dual arm system for aerial manipulation," in 2017 IEEE/RSJ International Conference on Intelligent Robots and Systems (IROS). IEEE, 2017, pp. 992-997.

[8] H. Chen, F. Quan, L. Fang, and S. Zhang, "Aerial grasping with a lightweight manipulator based on multi-objective optimization and visual compensation," Sensors, vol. 19, no. 19, p. 4253, 2019.

[9] S. Kim, S. Choi, and H. J. Kim, "Aerial manipulation using a quadrotor with a two dof robotic arm," in 2013 IEEE/RSJ International Conference on Intelligent Robots and Systems. IEEE, 2013, pp. 4990-4995.

[10] D. Mellinger, Q. Lindsey, M. Shomin, and V. Kumar, "Design, modeling, estimation and control for aerial grasping and manipulation," in 2011 IEEE/RSJ International Conference on Intelligent Robots and Systems. IEEE, 2011, pp. 2668-2673.

[11] J. Thomas, G. Loianno, K. Sreenath, and V. Kumar, "Toward image based visual servoing for aerial grasping and perching," in 2014 IEEE International Conference on Robotics and Automation (ICRA). IEEE, 2014, pp. 2113-2118.

[12] A. Jimenez-Cano, J. Braga, G. Heredia, and A. Ollero, "Aerial manipulator for structure inspection by contact from the underside," in 2015 IEEE/RSJ international conference on intelligent robots and systems (IROS). IEEE, 2015, pp. 1879-1884.

[13] M. Tognon, H. A. T. Cha'vez, E. Gasparin, Q. Sable', D. Bicego, A. Mallet, M. Lany, G. Santi, B. Revaz, J. Corte's et al., "A truly-redundant aerial manipulator system with application to push-and-slide inspection in industrial plants," IEEE Robotics and Automation Letters, vol. 4, no. 2, pp. 1846-1851, 2019.

[14] F. Ruggiero, M. A. Trujillo, R. Cano, H. Ascorbe, A. Viguria, C. Pere'z, V. Lippiello, A. Ollero, and B. Siciliano, "A multilayer control for multirotor uavs equipped with a servo robot arm," in 2015 IEEE international conference on robotics and automation (ICRA). IEEE, 2015, pp. 4014-4020.

[15] G. Heredia, A. Jimenez-Cano, I. Sanchez, D. Llorente, V. Vega, J. Braga, J. Acosta, and A. Ollero, "Control of a multirotor outdoor aerial manipulator," in 2014 IEEE/RSJ international conference on intelligent robots and systems. IEEE, 2014, pp. 3417-3422.

[16] A. Suarez, G. Heredia, and A. Ollero, "Physical-virtual impedance control in ultralightweight and compliant dual-arm aerial manipulators," IEEE Robotics and Automation Letters, vol. 3, no. 3, pp. 2553-2560, 2018.

[17] X. Meng, Y. He, and J. Han, "Survey on aerial manipulator: System, modeling, and control," Robotica, vol. 38, no. 7, pp. 1288-1317, 2020.

[18] K. Nonami, "Prospect and recent research & development for civil use autonomous unmanned aircraft as uav and mav," Journal of system Design and Dynamics, vol. 1, no. 2, pp. 120-128, 2007.

[19] P. E. Pounds, D. R. Bersak, and A. M. Dollar, "Practical aerial grasping of unstructured objects," in 2011 IEEE Conference on Technologies for Practical Robot Applications. IEEE, 2011, pp. 99-104.

_____ [20] "The yale aerial manipulator: grasping in flight," in 2011 IEEE International Conference on Robotics and Automation. IEEE, 2011, pp. 2974-2975.

_____ [21] "Grasping from the air: Hovering capture and load stability," in 2011 IEEE international conference on robotics and automation. IEEE, 2011, pp. 2491-2498.

[22] S. B. Backus, L. U. Odhner, and A. M. Dollar, "Design of hands for aerial manipulation: Actuator number and routing for grasping and perching," in 2014 IEEE/RSJ International Conference on Intelligent Robots and Systems. IEEE, 2014, pp. 34-40.

[23] P. E. Pounds and A. M. Dollar, "Stability of helicopters in compliant contact under pd-pid control," IEEE Transactions on Robotics, vol. 30, no. 6, pp. 1472-1486, 2014.

[24] K. Kondak, K. Krieger, A. Albu-Schaeffer, M. Schwarzbach, M. Laiacker, I. Maza, A. Rodriguez-Castano, and A. Ollero, "Closed-loop behavior of an autonomous helicopter equipped with a robotic arm for aerial manipulation tasks," International Journal of Advanced Robotic Systems, vol. 10, no. 2, p. 145, 2013.

[25] K. Kondak, F. Huber, M. Schwarzbach, M. Laiacker, D. Sommer, M. Bejar, and A. Ollero, "Aerial manipulation robot composed of an autonomous helicopter and a 7 degrees of freedom industrial manipulator," in 2014 IEEE international conference on robotics and automation (ICRA). IEEE, 2014, pp. 2107-2112.

[26] M. J. Kim, K. Kondak, and C. Ott, "A stabilizing controller for regulation of uav with manipulator," IEEE Robotics and Automation Letters, vol. 3, no. 3, pp. 1719-1726, 2018.

[27] M. J. Kim, R. Balachandran, M. De Stefano, K. Kondak, and C. Ott, "Passive compliance control of aerial manipulators," in 2018 IEEE/RSJ International Conference on Intelligent Robots and Systems (IROS). IEEE, 2018, pp. 4177-4184.

[28] R. V. Petrescu, R. Aversa, B. Akash, F. Berto, A. Apicella, and F. I. Petrescu, "Unmanned helicopters," Journal of Aircraft and Spacecraft Technology, vol. 1, no. 4, pp. 241-248, 2017.

[29] E. Fresk, D. Wuthier, and G. Nikolakopoulos, "Generalized center of gravity compensation for multirotors with application to aerial manipulation," in 2017 IEEE/RSJ International Conference on Intelligent Robots and Systems (IROS). IEEE, 2017, pp. 4424-4429.

[30] Y. Ohnishi, T. Takaki, T. Aoyama, and I. Ishii, "Development of a 4-joint 3-dof robotic arm with anti-reaction force mechanism for a multicopter," in 2017 IEEE/RSJ International Conference on Intelligent Robots and Systems (IROS). IEEE, 2017, pp. 985-991.

[31] J. Escareno, M. Rakotondrabe, G. Flores, and R. Lozano, "Rotorcraft may having an onboard manipulator:

Longitudinal modeling and robust control," in 2013 European Control Conference (ECC). IEEE, 2013, pp. 3258-3263.

[32] R. Rossi, A. Santamaria-Navarro, J. Andrade-Cetto, and P. Rocco, "Trajectory generation for unmanned aerial manipulators through quadratic programming," IEEE Robotics and Automation Letters, vol. 2, no. 2, pp. 389-396, 2016.

[33] L. Fang, H. Chen, Y. Lou, Y. Li, and Y. Liu, "Visual grasping for a lightweight aerial manipulator based on nsga-ii and kinematic compensation," in 2018 IEEE International Conference on Robotics and Automation (ICRA). IEEE, 2018, pp. 3488-3493.

[34] R. Miyazaki, R. Jiang, H. Paul, K. Ono, and K. Shimonomura, "Airborne docking for multi-rotor aerial manipulations," in 2018 IEEE/RSJ International Conference on Intelligent Robots and Systems (IROS). IEEE, 2018, pp. 4708-4714.

[35] A. Q. Keemink, M. Fumagalli, S. Stramigioli, and R. Carloni, "Mechanical design of a manipulation system for unmanned aerial vehicles," in 2012 IEEE international conference on robotics and automation. IEEE, 2012, pp. 3147-3152.

[36] S. Hamaza, I. Georgilas, and T. Richardson, "Towards an adaptive-compliance aerial manipulator for contact-based interaction," in 2018 IEEE/RSJ International Conference on Intelligent Robots and Systems (IROS). IEEE, 2018, pp. 1-9.

[37] F. Pierri, G. Muscio, and F. Caccavale, "An adaptive hierarchical control for aerial manipulators," Robotica, vol. 36, no. 10, pp. 1527-1550, 2018.

[38] A. Gawel, M. Kamel, T. Novkovic, J. Widauer, D. Schindler, B. P. Von Altishofen, R. Siegwart, and J. Nieto, "Aerial picking and delivery of magnetic objects with mavs," in 2017 IEEE international conference on robotics and automation (ICRA). IEEE, 2017, pp. 5746-5752.

[39] M. Kobilarov, "Nonlinear trajectory control of multibody aerial manipulators," Journal of Intelligent & Robotic Systems, vol. 73, no. 1, pp. 679-692, 2014.

[40] V. Ghadiok, J. Goldin, and W. Ren, "Autonomous indoor aerial gripping using a quadrotor," in 2011 IEEE/RSJ International Conference on Intelligent Robots and Systems. IEEE, 2011, pp. 4645-4651.

[41] P. E. Pounds and A. Dollar, "Hovering stability of helicopters with elastic constraints," in Dynamic Systems and Control Conference, vol. 44182, 2010, pp. 781-788.

[42] C. Wu, J. Qi, D. Song, X. Qi, T. Lin, and J. Han, "Development of an unmanned helicopter automatic barrels transportation system," in 2015 IEEE International Conference on Robotics and Automation (ICRA). IEEE, 2015, pp. 4686-4691.

[43] F. Augugliaro, S. Lupashin, M. Hamer, C. Male, M. Hehn, M. W. Mueller, J. S. Willmann, F. Gramazio, M. Kohler, and R. D'Andrea, "The flight assembled architecture installation: Cooperative construction with flying machines," IEEE Control Systems Magazine, vol. 34, no. 4, pp. 46-64, 2014.

[44] K. M. Popek, M. S. Johannes, K. C. Wolfe, R. A. Hegeman, J. M. Hatch, J. L. Moore, K. D. Katyal, B. Y. Yeh, and R. J. Bamberger, "Autonomous grasping robotic aerial system for perching (agrasp)," in 2018 IEEE/RSJ International Conference on Intelligent Robots and Systems (IROS). IEEE, 2018, pp. 1-9.

[45] A. Kalantari, K. Mahajan, D. Ruffatto, and M. Spenko, "Autonomous perching and take-off on vertical walls for a quadrotor micro air vehicle," in 2015 IEEE International Conference on Robotics and Automation (ICRA). IEEE, 2015, pp. 4669-4674.

[46] C. E. Doyle, J. J. Bird, T. A. Isom, J. C. Kallman, D. F. Bareiss, D. J. Dunlop, R. J. King, J. J. Abbott, and M. A. Minor, "An avian-inspired passive mechanism for quadrotor perching," IEEE/ASME Transactions On Mechatronics, vol. 18, no. 2, pp. 506-517, 2012.

[47] J. R. Kutia, W. Xu, and K. A. Stol, "Modeling and characterization of a canopy sampling aerial manipulator," in 2016 IEEE International Conference on Robotics and Biomimetics (ROBIO). IEEE, 2016, pp. 679-684.

[48] M. Kamel, K. Alexis, and R. Siegwart, "Design and modeling of dexterous aerial manipulator," in 2016 IEEE/RSJ International Conference on Intelligent Robots and Systems (IROS). IEEE, 2016, pp. 4870-4876.

[49] T. W. Danko, K. P. Chaney, and P. Y. Oh, "A parallel manipulator for mobile manipulating uavs," in 2015 IEEE international conference on technologies for practical robot applications (TePRA). IEEE, 2015, pp. 1-6.

[50] K. Baizid, G. Giglio, F. Pierri, M. A. Trujillo, G. Antonelli, F. Caccavale, A. Viguria, S. Chiaverini, and A. Ollero, "Experiments on behavioral coordinated control of an unmanned aerial vehicle manipulator system," in 2015 IEEE international conference on robotics and automation (ICRA). IEEE, 2015, pp. 4680-4685.

[51] H. Seo, S. Kim, and H. J. Kim, "Aerial grasping of cylindrical object using visual servoing based on stochastic model predictive control," in 2017 IEEE international conference on robotics and automation (ICRA). IEEE, 2017, pp. 6362-6368.

[52] G. Zhang, Y. He, B. Dai, F. Gu, L. Yang, J. Han, G. Liu, and J. Qi, "Grasp a moving target from the air: System & control of an aerial manipulator," in 2018 IEEE International Conference on Robotics and Automation (ICRA). IEEE, 2018, pp. 1681-1687.

[53] G. Garimella and M. Kobilarov, "Towards model-predictive control for aerial pick-and-place," in 2015 IEEE international conference on robotics and automation (ICRA). IEEE, 2015, pp. 4692-4697.

[54] C. D. Bellicoso, L. R. Buonocore, V. Lippiello, and B. Siciliano, "Design, modeling and control of a 5-dof light-weight robot arm for aerial manipulation," in 2015 23rd Mediterranean Conference on Control and Automation (MED). IEEE, 2015, pp. 853-858.

[55] T. W. Danko and P. Y. Oh, "A hyper-redundant manipulator for mobile manipulating unmanned aerial vehicles," in 2013 international conference on unmanned aircraft systems (ICUAS). IEEE, 2013, pp. 974-981.

[56] R. J. Webster III and B. A. Jones, "Design and kinematic modeling of constant curvature continuum robots: A review," The International Journal of Robotics Research, vol. 29, no. 13, pp. 1661-1683, 2010.

[57] S. Kolachalama and S. Lakshmanan, "Continuum robots for manipulation applications: A survey," Journal of Robotics, vol. 2020, 2020.

[58] Z. Samadikhoshkho, S. Ghorbani, and F. Janabi-Sharifi, "Modeling and control of aerial continuum manipulation systems: A flying continuum robot paradigm," IEEE Access, vol. 8, pp. 176 883-176 894, 2020.

[59] D. Bruder, X. Fu, R. B. Gillespie, C. D. Remy, and R. Vasudevan, "Koopman-based control of a soft continuum manipulator under variable loading conditions," IEEE Robotics and Automation Letters, vol. 6, no. 4, pp. 6852-6859, 2021.

[60] J. D. Ho, K.-H. Lee, W. L. Tang, K.-M. Hui, K. Althoefer, J. Lam, and K.-W. Kwok, "Localized online learning-based control of a soft redundant manipulator under variable loading," Advanced Robotics, vol. 32, no. 21, pp. 1,168-1183, 2018.

[61] F. Feng, W. Hong, and L. Xie, "A learning-based tip contact force estimation method for tendon-driven continuum manipulator," Scientific Reports, vol. 11, no. 1, pp. 1-11, 2021.

[62] F. Campisano, A. A. Remirez, S. Calo', J. H. Chandler, K. L. Obstein, R. J. Webster, and P. Valdastri, "Online disturbance estimation for improving kinematic accuracy in continuum manipulators," IEEE robotics and automation letters, vol. 5, no. 2, pp. 2642-2649, 2020.

[63] E. Picard, S. Caro, F. Claveau, and F. Plestan, "Pulleys and force sensors influence on payload estimation of cable-driven parallel robots," in 2018 IEEE/RSJ International Conference on Intelligent Robots and Systems (IROS). IEEE, 2018, pp. 1429-1436.

[64] Y. Lin, H. Zhao, and H. Ding, "External force estimation for industrial robots with flexible joints," IEEE Robotics and Automation Letters, vol. 5, no. 2, pp. 1311-1318, 2020.

[65] G. Gao, H. Wang, Q. Xia, M. Song, and H. Ren, "Study on the load capacity of a single-section continuum manipulator," Mechanism and Machine Theory, vol. 104, pp. 313-326, 2016.

[66] A. Yeshmukhametov, K. Koganezawa, A. Seidakhmet, and Y. Yamamoto, "Wire-tension feedback control for continuum manipulator to improve load manipulability feature," in 2020 IEEE/ASME International Conference on Advanced Intelligent Mechatronics (AIM). IEEE, 2020, pp. 460-465.

[67] H. In, S. Kang, and K.-J. Cho, "Capstan brake: Passive brake for tendon-driven mechanism," in 2012 IEEE/RSJ International Conference on Intelligent Robots and Systems. IEEE, 2012, pp. 2301-2306.

[68] K. Haiya, S. Komada, and J. Hirai, "Tension control for tendon mechanisms by compensation of nonlinear spring characteristic equation error," in 2010 11th IEEE International Workshop on Advanced Motion Control (AMC). IEEE, 2010, pp. 42-47.

[69] H. In, H. Lee, U. Jeong, B. B. Kang, and K.-J. Cho, "Feasibility study of a slack enabling actuator for actuating tendon-driven soft wearable robot without pretension," in 2015 IEEE International Conference on Robotics and Automation (ICRA). IEEE, 2015, pp. 1229-1234.

[70] J.-w. Suh, K.-y. Kim, J.-w. Jeong, and J.-j. Lee, "Design considerations for a hyper-redundant pulleyless rolling joint with elastic fixtures," IEEE/ASME Transactions on Mechatronics, vol. 20, no. 6, pp. 2841-2852, 2015.

[71] J.-W. Suh, J.-J. Lee, and D.-S. Kwon, "Underactuated miniature bending joint composed of serial pulleyless rolling joints," Advanced Robotics, vol. 28, no. 1, pp. 1-14, 2014.

[72] Y. Asano, T. Kozuki, S. Ookubo, K. Kawasaki, T. Shirai, K. Kimura, K. Okada, and M. Inaba, "A sensor-driver integrated muscle module with high-tension measurability and flexibility for tendon-driven robots," in 2015 IEEE/RSJ International Conference on Intelligent Robots and Systems (IROS). IEEE, 2015, pp. 5960-5965.

[73] M.-T. Yan and P.-H. Huang, "Accuracy improvement of wire-edm by real-time wire tension control," International Journal of Machine Tools and Manufacture, vol. 44, no. 7-8, pp. 807-814, 2004.

[74] J. Back, L. Lindenroth, K. Rhode, and H. Liu, "Model-free position control for cardiac ablation catheter steering using electromagnetic position tracking and tension feedback," Frontiers in Robotics and AI, vol. 4, p. 17, 2017.

[75] Q. Li, J. Bai, Y. Fan, and Z. Zhang, "Study of wire tension control system based on closed loop pid control in hs-wedm," The International Journal of Advanced Manufacturing Technology, vol. 82, no. 5-8, pp. 1089-1097, 2016.

[76] K. Oliver-Butler, J. Till, and C. Rucker, "Continuum robot stiffness under external loads and prescribed tendon displacements," IEEE Transactions on Robotics, vol. 35, no. 2, pp. 403-419, 2019.

[77] D. B. Camarillo, C. F. Milne, C. R. Carlson, M. R. Zinn, and J. K. Salisbury, "Mechanics modeling of tendon-driven continuum manipulators," IEEE transactions on Robotics, vol. 24, no. 6, pp. 1262-1273, 2008.

[78] Y. Liu and F. Alambeigi, "Effect of external and internal loads on tension loss of tendon-driven continuum manipulators," IEEE Robotics and Automation Letters, vol. 6, no. 2, pp. 1606-1613, 2021.

We claim:

1. An aerial continuum manipulator (AeCoM) system comprising:

an unmanned aerial vehicle (UAV) subsystem comprising:

a first multiplicity of motors mounted to the UAV and configured to generate thrust via a multiplicity of rotors, a first inertial measurement unit (IMUA) aligned with the UAV and configured to measure an attitude of the UAV, and a UAV controller (UAVC) configured to control the attitude of the UAV; and a tendon driven continuum robotic manipulator (CRM) subsystem comprising:

a CRM base mounted to the UAV, a CRM end-effector (EE) opposite the CRM base, one or more CRM sections between the CRM base and the EE, a multiplicity of tendons configured to activate the CRM, a second multiplicity of motors configured to generate tension in the multiplicity of tendons, a multiplicity of tension sensors configured to sense tension in the multiplicity of tendons, a second inertial measurement unit (IMUE) aligned with the EE and configured to measure a pose of the EE, and a CRM controller (CRMC) configured to control the pose of the EE; and a primary controller (PC) connected to both the UAVC and the CRMC;

wherein the PC is configured to receive the attitude of the UAV and send a UAV control signal to the UAVC;

wherein the PC is configured to receive the pose of the EE and send a CRM control signal to the CRMC;

wherein the PC is configured to calculate each of the CRM control signal and the UAV control signal, respectively, through a control scheme comprising a kinematics model based on constant-curvature geometrical mapping;

wherein the PC is configured to calculate each of the CRM control signal and the UAV control signal, respectively, through a closed-loop control method configured to minimize tendon slacking;

wherein the closed-loop control method uses the pose of the EE, the attitude of the UAV, and a multiplicity of tension sensor feedback signals from the multiplicity of tension sensors to calculate each of the CRM control signal and the UAV control signal.

2. The AeCoM system according to claim 1, wherein the closed-loop control method builds an attitude-rate-tension cascade closed loop control, comprising the EE pose for solving a task space, an EE rate for deciding a maneuver velocity, and the multiplicity of tension sensor feedback signals for slacking inhibition.

3. The AeCoM system according to claim 1, further comprising:

a first control board comprising the UAVC;

a second control board comprising the CRMC, the second control board physically separated from the first control board;

a third control board comprising the PC, the third control board physically separated from both the first control board and the second control board.

4. The AeCoM system according to claim 3, wherein the PC connects to the UAVC through a first serial port, and the PC connects to the CRMC through a second serial port.

5. The AeCoM system according to claim 4, wherein the UAVC does not connect to the CRMC directly, and the UAVC is only connected to the CRMC through the PC.

6. The AeCoM system according to claim 1, wherein the UAVC and the PC each are on a common control board, and the CRMC is on a remote control board physically separated from the common control board.

7. The AeCoM system according to claim 1, wherein the UAVC, the CRMC, and the PC each are on a comprehensive AeCoM control board.

8. The AeCoM system according to claim 7, wherein the IMUA is on the comprehensive AeCoM control board.

9. The AeCoM system according to claim 7, wherein the IMUA is not on the comprehensive AeCoM control board.

10. A method for controlling an end-effector (EE) pose of an aerial continuum manipulator (AeCoM) system having an unmanned aerial vehicle (UAV), a tendon driven continuum robotic manipulator (CRM) mounted on the UAV, the EE mounted on the CRM, a first inertial measurement unit (IMUA) mounted on the UAV, a second inertial measurement unit (IMUE) mounted on the EE, and a multiplicity of tension sensors mounted on the CRM; the method comprising:

receiving, by a first processor, a kinematics model based on constant-curvature geometrical mapping of at least the CRM, the kinematics model comprising an EE pose, a UAV attitude, and a multiplicity of tension values;

receiving, by the first processor, a desired EE pose, a current EE pose, a current UAV attitude, and a current multiplicity of tension values;

calculating, by the first processor, using the kinematics model, a closed loop control solution to reduce an error between the current EE pose and the desired EE pose while minimizing a measure of tendon slacking in the CRM, the closed loop control solution comprising a UAV attitude command signal and an EE pose command signal;

sending, by the first processor, the UAV attitude command signal to a second processor;

sending, by the first processor, the EE pose command signal to a third processor;

controlling, by the second processor, the UAV attitude; and controlling, by the third processor, the EE pose relative to the UAV attitude, to control the EE pose of the aerial continuum manipulator (AeCoM) system.

11. The method according to claim 10, wherein the calculating comprises an attitude-rate-tension cascade closed loop control, using the EE pose for solving a task space, an EE rate for deciding a maneuver velocity, and the multiplicity of tension values for slacking inhibition.

12. The method according to claim 1, the controlling, by the second processor the UAV attitude, comprising two loops: position and velocity control in an outer loop, and attitude control in an inner loop.

13. The method according to claim 11, the controlling, by the third processor, the EE pose relative to the UAV attitude, comprising three consecutive control layers.

14. The method according to claim 13, the three consecutive control layers comprising an innermost layer having tension constraints for controlling each motor, to restrict lowest tension for each tendon and reduce tension loss and tendon slacking.

* * * * *